(12) United States Patent
Kim et al.

(10) Patent No.: US 11,575,904 B2
(45) Date of Patent: Feb. 7, 2023

(54) BIDIRECTIONAL PREDICTION METHOD AND VIDEO DECODING APPARATUS

(71) Applicant: SK TELECOM CO., LTD., Seoul (KR)

(72) Inventors: Jae Il Kim, Seoul (KR); Sun Young Lee, Seoul (KR); Tae Young Na, Seoul (KR); Se Hoon Son, Seoul (KR); Jae Seob Shin, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 17/359,953

(22) Filed: Jun. 28, 2021

(65) Prior Publication Data

US 2022/0224908 A1    Jul. 14, 2022

Related U.S. Application Data

(63) Continuation of application No. PCT/KR2019/018477, filed on Dec. 26, 2019.

(30) Foreign Application Priority Data

Dec. 27, 2018  (KR) .................. 10-2018-0171254
Aug. 28, 2019  (KR) .................. 10-2019-0105769

(51) Int. Cl.
*H04N 19/159*    (2014.01)
*H04N 19/70*     (2014.01)
(Continued)

(52) U.S. Cl.
CPC ......... *H04N 19/137* (2014.11); *H04N 19/105* (2014.11); *H04N 19/159* (2014.11); *H04N 19/176* (2014.11); *H04N 19/70* (2014.11)

(58) Field of Classification Search
CPC .. H04N 19/137; H04N 19/105; H04N 19/159; H04N 19/176; H04N 19/70
(Continued)

(56) References Cited

U.S. PATENT DOCUMENTS

| | | | |
|---|---|---|---|
| 2021/0266588 A1* | 8/2021 | Liu | ................ H04N 19/157 |
| 2021/0360256 A1* | 11/2021 | Liu | ................ H04N 19/52 |
| 2021/0360279 A1* | 11/2021 | Liu | ................ H04N 19/46 |

FOREIGN PATENT DOCUMENTS

| | | | | |
|---|---|---|---|---|
| KR | 10-2018-0043787 A | | 4/2018 | |
| WO | WO-2013138639 A1 * | | 9/2013 | ............ H04N 19/51 |

(Continued)

OTHER PUBLICATIONS

Hongbin Liu et al., "CE9-related: Motion Vector Refinement in Bi-directional Optical Flow", Joint Video Experts Team (JVET) of ITU-T SG 16 WP 3 and ISO/IEC JTC 1/SC 29/WG 11, Macao, CN, Oct. 3-12, 2018, 4 Pages.

(Continued)

*Primary Examiner* — Albert Kir
(74) *Attorney, Agent, or Firm* — Hauptman Ham, LLP

(57) ABSTRACT

A method of inter-predicting a current block using any one of a plurality of bi-prediction modes is disclosed. The method comprises decoding, from a bitstream, mode information indicating whether a first mode included in the plurality of bi-prediction modes is applied to the current block. When the mode information indicates that the first mode is applied to the current block, the method further comprises: decoding, from the bitstream, first motion information including differential motion vector information and predicted motion vector information for a first motion vector and second motion information not including at least a portion of predicted motion vector information and differ- (Continued)

ential motion vector information for a second motion vector; and deriving the first motion vector based on the first motion information and deriving the second motion vector based on both at least a portion of the first motion information and the second motion information.

17 Claims, 19 Drawing Sheets

(51) Int. Cl.
  *H04N 19/137* (2014.01)
  *H04N 19/105* (2014.01)
  *H04N 19/176* (2014.01)

(58) Field of Classification Search
  USPC .................................................. 375/240.02
  See application file for complete search history.

(56) References Cited

FOREIGN PATENT DOCUMENTS

| WO | 2017/039117 A1 | 3/2017 | |
|---|---|---|---|
| WO | WO-2019216325 A1 * | 11/2019 | ............ H04N 19/105 |
| WO | WO-2020146547 A1 * | 7/2020 | ............. G06T 17/00 |

OTHER PUBLICATIONS

Xiaoyu Xiu et al., "CE9-related: Complexity reduction and bit-width control for bi-directional optical flow (BIO)", Joint Video Experts Team (JVET) of ITU-T SG 16 WP 3 and ISO/IEC JTC 1/SC 29/WG 11, Macao, CN, Oct. 3-12, 2018, 16 Pages.
Haitao Yang et al., "Description of Core Experiment 4 (CE4): Inter prediction and motion vector coding", Joint Video Experts Team (JVET) of ITU-T SG 16 WP 3 and ISO/IEC JTC 1/SC 29/WG 11, Macao, CN, Oct. 3-12, 2018, 16 Pages.
International Search Report dated Mar. 23, 2020, corresponding to International Application No. PCT/KR2019/018477.

* cited by examiner (A)  (B)

(C)  (D)

BIDIRECTIONAL PREDICTION METHOD AND VIDEO DECODING APPARATUS

CROSS-REFERENCE TO RELATED APPLICATION

This application is a continuation of PCT/KR2019/018477 filed on Dec. 26, 2019, which is based on and claims priority to Korean Patent Application No. 10-2018-0171254 filed on Dec. 27, 2018 and Korean Patent Application No. 10-2019-0105769 filed on Aug. 28, 2019, which are incorporated herein by reference in their entirety.

TECHNICAL FIELD

The present invention relates to encoding and decoding of a video, and more particularly, to a bidirectional prediction method with improved encoding and decoding efficiency by efficiently expressing motion information, and a video decoding device.

BACKGROUND

Since the volume of video data is larger than that of voice data or still image data, storing or transmitting video data without processing for compression requires a lot of hardware resources including memory.

Accordingly, in storing or transmitting video data, the video data is generally compressed using an encoder so as to be stored or transmitted. Then, a decoder receives the compressed video data, and decompresses and reproduces the video data. Compression techniques for such video include H.264/AVC and High Efficiency Video Coding (HEVC), which improves coding efficiency over H.264/AVC by about 40%.

However, the video size, resolution, and frame rate are gradually increasing, and accordingly the amount of data to be encoded is also increasing. Accordingly, a new compression technique having better encoding efficiency and higher image quality than the existing compression technique is required.

SUMMARY

Technical Problem

An object of the present invention is to provide an improved video encoding and decoding technology, and more particular, to a technology of improving encoding and decoding efficiency by deducing motion information in other directions using motion information in a specific direction.

Technical Solution

According to at least one aspect, the present disclosure provides a method of inter-predicting a current block using any one of a plurality of bi-prediction modes. The method comprises decoding, from a bitstream, mode information indicating whether a first mode included in the plurality of bi-prediction modes is applied to the current block. When the mode information indicates that the first mode is applied to the current block, the method further comprises: decoding, from the bitstream, first motion information including differential motion vector information and predicted motion vector information for a first motion vector and second motion information not including at least a portion of predicted motion vector information and differential motion vector information for a second motion vector; and deriving the first motion vector based on the first motion information and deriving the second motion vector based on both at least a portion of the first motion information and the second motion information. The method further comprises predicting the current block using a reference block indicated by the first motion vector in a first reference picture and a reference block indicated by the second motion vector in a second reference picture.

According to another aspect, the present disclosure provides a video decoding apparatus. The apparatus comprises a decoder configured to decode, from a bitstream, mode information indicating whether a first mode included in a plurality of bi-prediction modes is applied to a current block. The decoder decode, from the bitstream, first motion information including differential motion vector information and predicted motion vector information for a first motion vector and second motion information not including at least a portion of predicted motion vector information and differential motion vector information for a second motion vector when the mode information indicates that the first mode is applied to the current block. The apparatus comprises a prediction unit configured to derive the first motion vector based on the first motion information and derive the second motion vector based on both at least a portion of the first motion information and the second motion information. The predictor is configured to predict the current block using a reference block indicated by the first motion vector in a first reference picture and a reference block indicated by the second motion vector in a second reference picture.

Advantageous Effects

As described above, according to an embodiment of the present invention, it is possible to improve bit efficiency for motion representation by deducing motion in other directions using motion in a specific direction.

DETAILED DESCRIPTION

Figure 1:
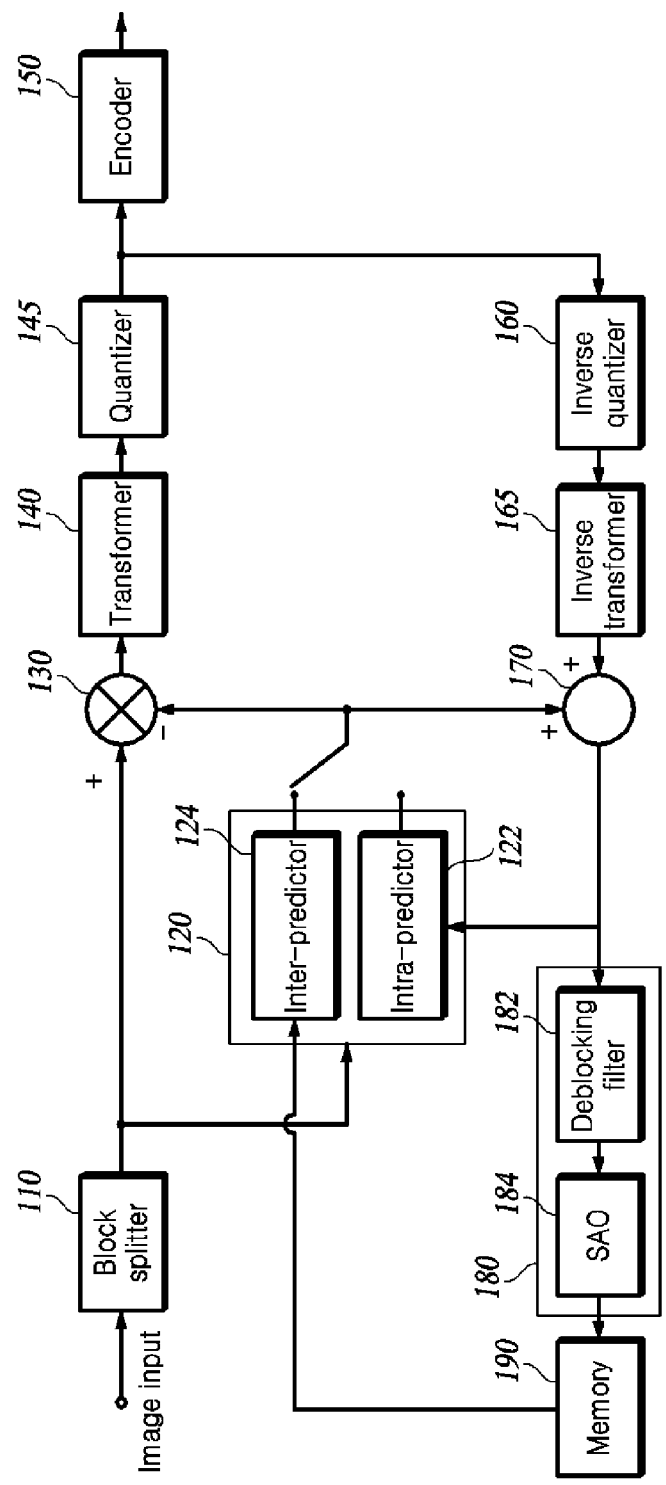
FIG. 1 is an exemplary block diagram of a video encoding apparatus capable of implementing the techniques of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a block splitter 110, a predictor 120, a subtractor 130, a transformer 140, a quantizer 145, an encoder 150, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented in software, and a microprocessor may be implemented to execute the software functions corresponding to the respective elements.

One video is composed of a plurality of pictures. Each picture is split into a plurality of regions, and encoding is performed on each region. For example, one picture is split into one or more tiles and/or slices. Here, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one tile in common is encoded as a syntax of the tile or encoded as a syntax of a tile group, which is a collection of multiple tiles, and information applied to all blocks constituting one picture is encoded in a picture parameter set (PPS) or a picture header. Further, information referred to by a plurality of pictures in common is encoded in a sequence parameter set (SPS). In addition, information referred to by one or more SPSs in common is encoded in a video parameter set (VPS).

The block splitter 110 determines the size of a coding tree unit (CTU). Information about the size of the CTU (CTU size) is encoded as a syntax of the SPS or PPS and is transmitted to the video decoding apparatus.

The block splitter 110 splits each picture constituting a video into a plurality of CTUs having a predetermined size, and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) having the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QTBT (QuadTree plus BinaryTree) structure or a QTBTTT (QuadTree plus BinaryTree TernaryTree) structure may be used. Here, BTTTs may be collectively referred to as a multiple-type tree (MTT).

Figure 2:
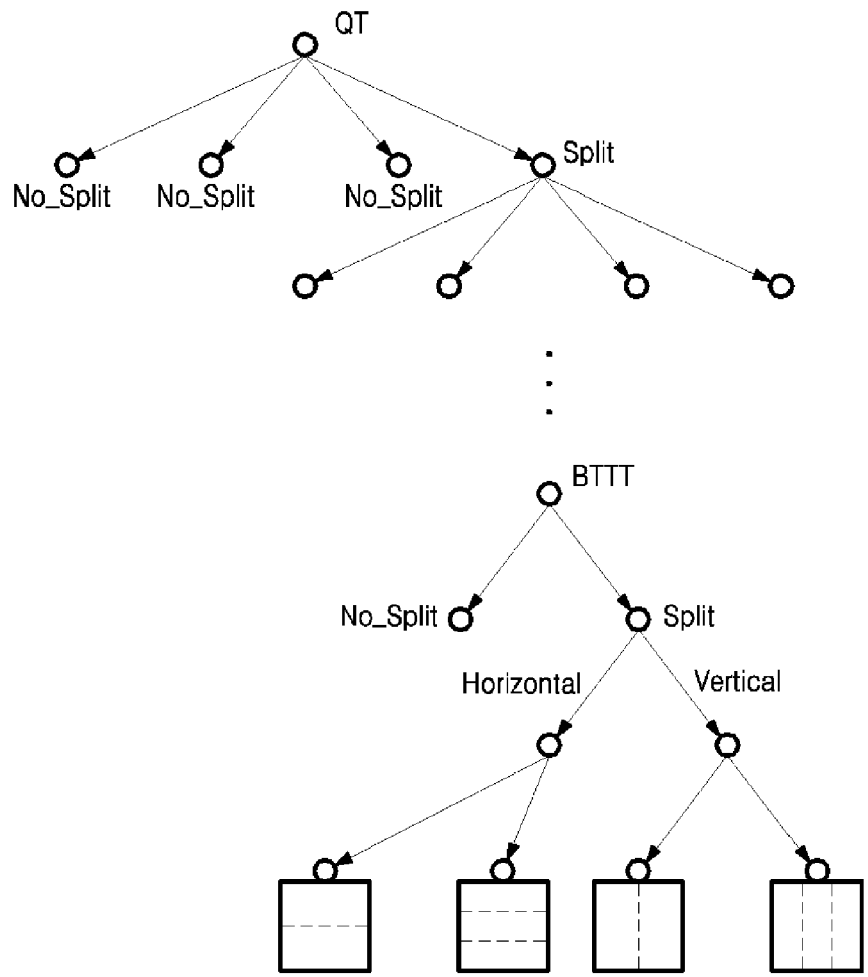
FIG. 2 exemplarily shows block partitioning structure using a QTBTTT structure.

FIG. 2 shows a QTBTTT splitting tree structure. As shown in FIG. 2, a CTU may be initially split in the QT structure. The QT splitting may be repeated until the size of the splitting block reaches the minimum block size (MinQT-Size) of a leaf node allowed in the QT. A first flag (QT_split_flag) indicating whether each node of the QT structure is split into four nodes of a lower layer is encoded and signaled to the video decoding apparatus by the encoder 150. When the leaf node of the QT is not larger than the maximum block size (MaxBTSize) of the root node allowed in BT, it may be further split in one or more of the BT structure or the TT structure. In the BT structure and/or the TT structure, there may be a plurality of splitting directions. For example, there may be two directions, which are horizontal splitting and vertical splitting of the block of the node. As shown in FIG. 2, when MTT splitting starts, a second flag (mtt_split_flag) indicating whether nodes are split, and a flag indicating a splitting direction (vertical or horizontal), and/or a flag indicating a splitting type (Binary or Ternary) are encoded and signaled to the video decoding apparatus by the encoder 150.

As another example of the tree structure, when a block is split using the QTBTTT structure, information about a CU split flag (split_cu_flag) indicating that the block has been split and a QT split flag (split_qt_flag) indicating whether the splitting type is QT splitting is encoded and signaled to the video decoding apparatus by the encoder 150. When the value of split_cu_flag indicates that the block has not been split, the block of the node becomes a leaf node in the splitting tree structure and is used as a coding unit (CU), which is a basic unit of encoding. When the value of split_cu_flag indicates that the block has not been split, whether the splitting type is QT or MTT is distinguished by the value of split_qt_flag. When the splitting type is QT, there is no additional information. When the splitting type is MTT, a flag (mtt_split_cu_vertical_flag) indicating the MTT splitting direction (vertical or horizontal) and/or a flag (mtt_split_cu_binary_flag) indicating the MTT splitting type (Binary or Ternary) are encoded and signaled to the video decoding apparatus by the encoder 150.

As another example of the tree structure, when QTBT is used, there may be two splitting types, which are horizontal splitting (i.e., symmetric horizontal splitting) and vertical splitting (i.e., symmetric vertical splitting) of a block of a node into two blocks of the same size. A split flag (split_flag) indicating whether each node of the BT structure is split into blocks of a lower layer and split type information indicating the splitting type are encoded and transmitted to the video decoding apparatus by the encoder 150. There may be an additional type, which is splitting a block of a node into two asymmetric blocks. The asymmetric splitting type may include a type of splitting a block into two rectangular blocks at a size ratio of 1:3, and a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block."

The predictor 120 predicts a current block to generate a predicted block. The predictor 120 includes an intra-predictor 122 and an inter-predictor 124.

In general, each of the current blocks in a picture may be predictively coded. Prediction of a current block may be performed using the technique of intra-prediction (which is performed based on the data from a picture containing the current block) or the technique of inter-prediction (which is performed based on the data from a picture coded before the picture containing the current block). Inter-prediction includes both uni-directional prediction and bi-directional prediction.

Figure 3:
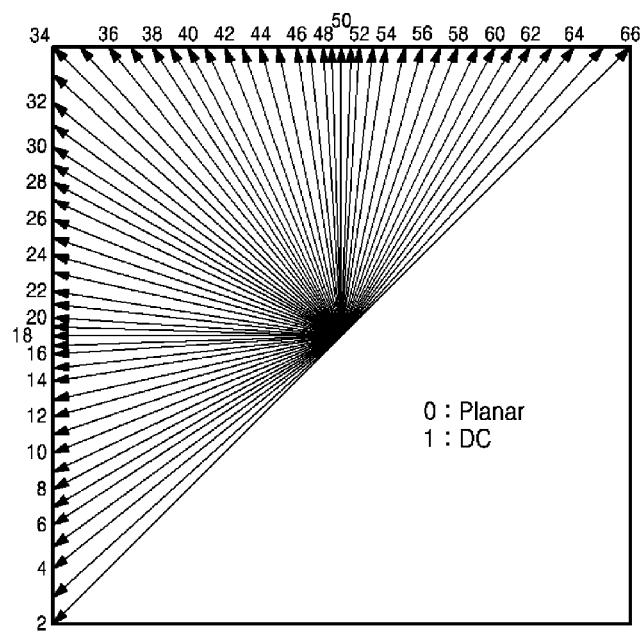
FIG. 3 exemplarily shows a plurality of intra-prediction modes.

The intra-predictor 122 predicts pixels in the current block using pixels (reference pixels) located around the current block in the current picture including the current block. There is a plurality of intra-prediction modes according to the prediction directions. For example, as shown in FIG. 3, the plurality of intra-prediction modes may include non-directional modes, which include a planar mode and a DC mode, and 65 directional modes. Neighboring pixels and an equation to be used are defined differently for each prediction mode.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes, and may select an intra-prediction mode that has the best rate distortion characteristics among the tested modes.

The intra-predictor 122 selects one intra-prediction mode from among the plurality of intra-prediction modes, and predicts the current block using neighboring pixels (reference pixel) and an equation determined according to the selected intra-prediction mode. Information about the selected intra-prediction mode is encoded by the encoder 150 and transmitted to the video decoding apparatus.

The inter-predictor 124 generates a predicted block for the current block through a motion compensation process. The inter-predictor searches for a block most similar to the current block in a reference picture encoded and decoded earlier than the current picture, and generates a predicted block for the current block based on the searched block. Then, the inter-predictor generates a motion vector corresponding to a displacement between the current block in the current picture and the predicted block in the reference picture. In general, motion estimation is performed on a luma component, and a motion vector calculated based on the luma component is used for both the luma component and the chroma component. Motion information including information on the reference picture used to predict the current block and information on the motion vector is encoded and transmitted to the video decoding apparatus by the encoder 150.

The subtractor 130 generates a residual block by subtracting the predicted block generated by the intra-predictor 122 or the inter-predictor 124 from the current block.

The transformer 140 transforms a residual signal in a residual block having pixel values in the spatial domain into a transform coefficient in the frequency domain. The transformer 140 may transform the residual signals in the residual block using the total size of the current block as a transformation unit. Alternatively, the transformer may split the residual block into sub-blocks of a transform region and non-transform region, and transform the residual signals using only the sub-block of the transform region as a transformation unit. Here, the transform region sub-block may be one of two rectangular blocks having a size ratio of 1:1 based on the horizontal axis (or vertical axis). In this case, a flag (cu_sbt_flag) indicating that only the subblock has been transformed, directional (vertical/horizontal) information (cu_sbt_horizontal_flag), and/or location information (cu_sbt_pos_flag) are encoded and signaled to the video decoding apparatus by the encoder 150. In addition, the size of the transform region sub-block may have a size ratio of 1:3 based on the horizontal axis (or vertical axis). In this case, a flag (cu_sbt_quad_flag) for distinguishing the splitting is additionally encoded signaled to the video decoding apparatus by the encoder 150.

The quantizer 145 quantizes transform coefficients output from the transformer 140, and outputs the quantized transform coefficients to the encoder 150.

The encoder 150 generates a bitstream by encoding the quantized transform coefficients using an encoding method such as Context-based Adaptive Binary Arithmetic Code (CABAC). The encoder 150 encodes information such as the CTU size, CU split flag, QT split flag, MTT splitting direction, and MTT splitting type related to block splitting, such that the video decoding apparatus splits the block in the same manner as the video encoding apparatus.

Further, the encoder 150 encodes information about a prediction type indicating whether the current block is encoded by intra-prediction or by inter-prediction, and encodes intra-prediction information (i.e., information about an intra-prediction mode) or inter-prediction information (information about a reference picture and a motion vector) according to the prediction type.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the predicted block generated by the predictor 120 to reconstruct the current block. The pixels in the reconstructed current block are used as reference pixels for intra-prediction of the next block.

The filter unit 180 filters the reconstructed pixels to reduce blocking artifacts, ringing artifacts, and blurring artifacts generated due to block-based prediction and transformation/quantization. The filter unit 180 may include a deblocking filter 182 and a sample adaptive offset (SAO) filter 184.

The deblocking filter 180 filters the boundary between the reconstructed blocks to remove blocking artifacts caused by block-by-block encoding/decoding, and the SAO filter 184 additionally filters the deblocking filtered video. The SAO filter 184 is a filter used to compensate for a difference between a reconstructed pixel and an original pixel caused by lossy coding.

The reconstructed blocks filtered through the deblocking filter 182 and the SAO filter 184 are stored in the memory 190. Once all blocks in one picture are reconstructed, the reconstructed picture is used as a reference picture for inter-prediction of blocks in the next picture to be encoded.

Figure 4:
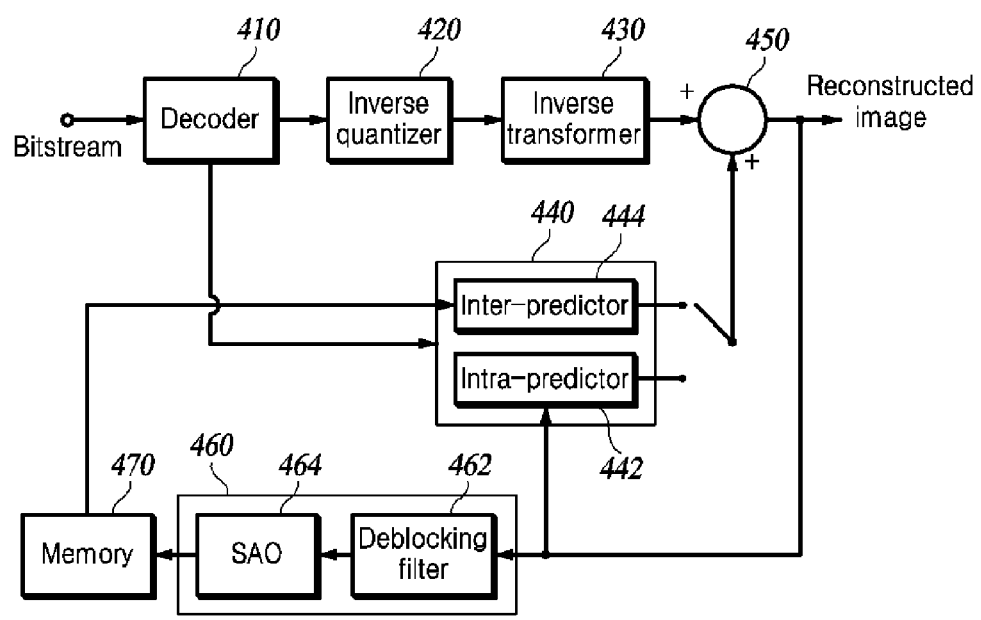
FIG. 4 is an exemplary block diagram of a video decoding apparatus capable of implementing the techniques of the present disclosure.

FIG. 4 is an exemplary functional block diagram of a video decoding apparatus capable of implementing the techniques of the present disclosure. Hereinafter, the video decoding apparatus and elements of the apparatus will be described with reference to FIG. 4.

The video decoding apparatus may include a decoder 410, an inverse quantizer 420, an inverse transformer 430, a predictor 440, an adder 450, a filter unit 460, and a memory 470.

Similar to the video encoding apparatus of FIG. 1, each element of the video decoding apparatus may be implemented as hardware or software, or may be implemented as a combination of hardware and software. In addition, the function of each element may be implemented as software, and a microprocessor may be implemented to execute the functions of software corresponding to each element.

The decoder 410 determines a current block to be decoded by decoding the bitstream received from the video encoding apparatus and extracting information related to block splitting, and extracts prediction information and information on residual signals necessary to reconstruct the current block.

The decoder 410 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node of a tree structure, and extracts splitting information about the CTU to split the CTU using the tree structure.

For example, when the CTU is split using the QTBTTT structure, a first flag (QT_split_flag) related to QT splitting is first extracted and each node is split into four nodes of a lower layer. Then, for a node corresponding to the leaf node of QT, a second flag (MTT_split_flag) related to MTT splitting and information on the splitting direction (vertical/horizontal) and/or splitting type (binary/ternary) are extracted, and the leaf node is split in the MTT structure. In this way, each node below the leaf node of the QT is recursively split in a BT or TT structure.

As another example, when a CTU is split using the QTBTTT structure, a CU split flag (split_cu_flag) indicating whether a CU is split is first extracted. If the corresponding block is split, a QT split flag (split_qt_flag) is extracted. When the splitting type is not QT but MTT, a flag (mtt_split_cu_vertical_flag) indicating the MTT splitting direction (vertical or horizontal) and/or a flag (mtt_split_cu_binary_flag) indicating the MTT splitting type (Binary or Ternary) is additionally extracted. In the splitting process, each node may be subjected to recursive QT splitting zero or more times, and then subjected to recursive MTT splitting zero or more times. For example, the CTU may be MTT-split immediately, or may only be QT-split multiple times.

As another example, when the CTU is split using the QTBT structure, the first flag (QT_split_flag) related to the QT spitting, and each node is split into four nodes of a lower layer. For a node corresponding to the leaf node of the QT, the split_flag indicating whether the node is further BT-split and splitting direction information are extracted.

Upon determining the current block to be decoded through tree structure splitting, the decoder 410 extracts information about a prediction type indicating whether the current block is subjected to intra-prediction or inter-prediction. When the prediction type information indicates intra-prediction, the decoder 410 extracts a syntax element for the intra-prediction information (intra-prediction mode) for the current block. When the prediction type information indicates inter-prediction, the decoder 410 extracts a syntax element for the inter-prediction information, that is, information indicating a motion vector and a reference picture referred to by the motion vector.

The decoder 410 extracts information about quantized transform coefficients of the current block as information about residual signals.

The inverse quantizer 420 inversely quantizes the quantized transform coefficients, and inversely transforms the inversely quantized transform coefficients from the frequency domain to the spatial domain to reconstruct residual signals to generate a residual block for the current block.

In addition, when the inverse transformer 430 inversely transforms only a partial region (sub-block) of a transform block, a flag (cu_sbt_flag) indicating that only a sub-block of the transform block has been transformed, and the direction information (vertical/horizontal) about the sub-block (cu_sbt_horizontal_flag) and/or sub-block location information (cu_sbt_pos_flag) are extracted. Then, residual signals are reconstructed by inversely transforming the transform coefficients of the sub-block from the frequency domain to the spatial domain. For the region that is not inversely transformed, the residual signal is filled with "0". Thereby, the final residual block for the current block is created.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 determines an intra-prediction mode of the current block among a plurality of intra-prediction modes based on a syntax element for the intra-prediction mode extracted from the decoder 410, and predicts the current block based on the reference pixels around the current block according to the intra-prediction mode.

The inter-predictor 444 determines a motion vector of the current block and a reference picture referenced by the motion vector based on the syntax element for the intra-prediction mode extracted from the decoder 410, and predicts the current block based on the motion vector and the reference picture.

The adder 450 reconstructs the current block by adding the residual block output from the inverse transformer and the predicted block output from the inter-predictor or the intra-predictor. The pixels in the reconstructed current block are used as reference pixels for intra-prediction of a block to be decoded later.

The filter unit 460 may include a deblocking filter 462 and an SAO filter 464. The deblocking filter 462 performs deblocking filtering on the boundary between reconstructed blocks to remove blocking artifacts caused by block-by-block decoding. The SAO filter 464 performs additional filtering on a reconstructed block after deblocking filtering in order to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of a block in a picture to be encoded thereafter.

The inter-picture prediction encoding/decoding method (inter prediction method) of the HEVC standard may be classified into a skip mode, a merge mode, and an adaptive (or advanced) motion vector predictor (AMVP) mode.

In the skip mode, an index value indicating one of motion information candidates of neighboring blocks is signaled. In the merge mode, an index value indicating one of motion information candidates of neighboring blocks and information obtained by encoding a residual after prediction are signaled. In the AMVP mode, motion information of the current block and information obtained by encoding the residual after prediction are signaled. The motion information signaled in the AMVP mode includes motion information (motion vector predictor (mvp)) of a neighboring block and a difference value (motion vector difference (mvd)) between the motion information (mvp) and motion information (mv) of the current block.

Describing the motion information signaled in the AMVP mode in more detail, the motion information may include reference picture information (reference picture index), predicted motion vector (mvp) information, and differential motion vector (mvd) information. In the case of bi-prediction, the above information is separately signaled for each direction. Table 1 below shows syntax elements for the reference picture information, the mvp information, and the mvd information signaled for each direction

TABLE 1

```
prediction_unit( x0, y0, nPbW, nPbH ) {                                    Descriptor
    if( cu_skip_flag[ x0 ][ y0 ] ) {
        if( MaxNumMergeCand > 1 )
            merge_idx[ x0 ][ y0 ]                                          ae(v)
    } else { /* MODE_INTER */
        merge_flag[ x0 ][ y0 ]                                             ae(v)
        if( merge_flag[ x0 ][ y0 ] ) {
            if( MaxNumMergeCand > 1 )
                merge_idx[ x0 ][ y0 ]                                      ae(v)
        } else {
            if( tile_group_type = = B )
                inter_pred_idc[ x0 ][ y0 ]                                 ae(v)
            if( inter_pred_idc[ x0 ][ y0 ] != PRED_L1 ) {
                if( num_ref_idx_l0_active_minus1 > 0 )
                    ref_idx_l0[ x0 ][ y0 ]                                 ae(v)
                mvd_coding( x0, y0, 0 )
                mvp_l0_flag[ x0 ][ y0 ]                                    ae(v)
            }
            if( inter_pred_idc[ x0 ][ y0 ] != PRED_L0 ) {
                if( num_ref_idx_l1_active_minus1 > 0 )
                    ref_idx_l1[ x0 ][ y0 ]                                 ae(v)
                if( mvd_l1_zero_flag && inter_pred_idc[ x0 ][ y0 ] = = PRED_BI )
                {
                    MvdL1[ x0 ][ y0 ][ 0 ] = 0
                    MvdL1[ x0 ][ y0 ][ 1 ] = 0
                } else
                    mvd_coding( x0, y0, 1 )
                mvp_l1_flag[ x0 ][ y0 ]                                    ae(v)
            }
        }
    }
}
```

In Table 1 above, inter_pred_idc is a syntax element (prediction direction information) indicating a prediction direction and may indicate any one of uni-L0, uni-L1, and bi-prediction. According to the present invention, since motion information in a specific direction is derived from motion information in the other direction, inter_pred_idc indicates bi-prediction. ref_idx_l0 is a syntax element (reference picture information) indicating a reference picture in direction L0, and a reference picture used for prediction of the current block among reference pictures included in reference picture list 0 is specified through this syntax element. ref_idx_l1 is a syntax element (reference picture information) indicating a reference picture in direction L1, and a reference picture used for prediction of the current block among reference pictures included in reference picture list 1 is specified through this syntax element. mvp_l0_flag is a syntax element (mvp information) indicating mvp for the direction L0, and the mvp to be used for prediction in the direction L0 of the current block is specified through this syntax element. mvp_l1_flag is a syntax element (mvp information) indicating the mvp for the direction L1, and the mvp to be used for prediction in the direction L1 of the current block is specified through this syntax element.

The syntax elements constituting the mvd information are expressed in Table 2 below.

TABLE 2

| | Descriptor |
|---|---|
| mvd_coding( x0, y0, refList ) { | |
|   abs_mvd_greater0_flag[ 0 ] | ae(v) |
|   abs_mvd_greater0_flag[ 1 ] | ae(v) |
|   if( abs_mvd_greater0_flag[ 0 ] ) | |
|     abs_mvd_greater1_flag[ 0 ] | ae(v) |
|   if( abs_mvd_greater0_flag[ 1 ] ) | |
|     abs_mvd_greater1_flag[ 1 ] | ae(v) |
|   if( abs_mvd_greater0_flag[ 0 ] ) { | |
|     if( abs_mvd_greater1_flag[ 0 ] ) | |

TABLE 2-continued

| | Descriptor |
|---|---|
|       abs_mvd_minus2[ 0 ] | ae(v) |
|     mvd_sign_flag[ 0 ] | ae(v) |
|   } | |
|   if( abs_mvd_greater0_flag[ 1 ] ) { | |
|     if( abs_mvd_greater1_flag[ 1 ] ) | |
|       abs_mvd_minus2[ 1 ] | ae(v) |
|     mvd_sign_flag[ 1 ] | ae(v) |
|   } | |
| } | |

In Table 2 above, abs_mvd_greater0_flag is a syntax element indicating whether an absolute value (magnitude) of the mvd exceeds 0, and abs_mvd_greater1_flag is a syntax element indicating whether an absolute value of the mvd exceeds 1. In addition, abs_mvd_minus2 is a syntax element indicating a value obtained by subtracting 2 from the absolute value of the mvd, and mvd_sign_flag corresponds to a syntax element indicating a sign of the mvd.

As shown in Table 2, the mvd is expressed through syntax elements (abs_mvd_greater1_flag, abs_mvd_greater1_flag, and abs_mvd_minus2) indicating absolute values for each of the x component and the y component, and a syntax element (mvd_sign_flag) indicating the sign.

Table 3 below summarizes information signaled from the video encoding apparatus to the video decoding apparatus for bi-prediction of the conventional AMVP mode based on the contents described in Tables 1 and 2.

TABLE 3

| | |
|---|---|
| prediction direction information (bi-prediction) | inter_pred_idc |
| reference picture information (for L0 and L1) | ref_idx_l0, ref_idx_l1 |
| mvp information (for L0 and L1) | mvp_l0_flag, mvp_l1_flag |
| mvd for L0 | abs_mvd_greater0_flag, abs_mvd_greater1_flag, |

TABLE 3-continued

| | |
|---|---|
| mvd for L1 | abs_mvd_minus2, mvd_sign_flag abs_mvd_greater0_flag, abs_mvd_greater1_flag, abs_mvd_minus2, mvd_sign_flag |

As shown in Table 3 above, in the conventional AMVP mode, in order to perform bi-prediction on the current block, reference picture information, mvp information, mvd information, etc. are separately signaled for each direction, which may be inefficient in terms of bit efficiency.

The present invention relates to, so as to improve bit efficiency for bi-prediction, deducing motion information in the other direction from motion information in a specific direction using a correlation between pieces of motion information in each direction or by deducing reference pictures used for prediction of the current block.

The "specific direction" indicates a direction in which motion information is deduced or derived based on information signaled from the video encoding apparatus, and the "other direction" indicates a direction in which motion information is deduced or derived based on motion information in the specific direction. In a process of deducing the motion information in the other direction, at least some of the motion information in the specific direction and/or the information signaled from the video encoding apparatus may be used. In this specification, it is described that the specific direction corresponds to direction L0 and the other direction corresponds to direction L1, but the specific direction may correspond to any one of the directions L0 and L1, and the other direction may correspond to the remaining direction that does not correspond to the specific direction among both directions. Hereinafter, the specific direction is referred to as a first direction, and the other direction is referred to as a second direction. In addition, a motion vector in the first direction is referred to as a first motion vector, and a motion vector in the second direction is referred to as a second motion vector.

The correlation between the pieces of motion information may include a symmetric relationship, a linear relationship, a proportional relationship, a picture order count (POC) difference relationship between reference pictures based on the current picture, etc., which are established between the pieces of motion information. Such a correlation may be established for all pieces of motion information and may be established individually for each element (at least one of the reference picture information, the mvp information, and the mvd information) included in the motion information. For example, the symmetric relationship may be established between the pieces of mvd information in both directions, and the linear relationship may be established between the mvp information (indicated by mvp_flag) in both directions and the mvd information in both directions. Here, the establishment of the linear relationship of the mvp information and the mvd information in both directions may be understood as establishing the linear relationship between the motion vectors (motions) in both directions.

In connection with the name of the motion information referred to in this specification, the motion information in the specific direction (first direction) is referred to as first motion information, and the motion information in the other direction (second direction) is referred to as second motion information or third motion information depending on the number or type of included elements. The third motion information is the motion information in the second direction, and may be motion information including both the mvd information in the second direction and the mvp information in the second direction. Both the second motion information and the third motion information correspond to the motion information in the second direction but may be classified according to whether both the mvd information and the mvp information in the second direction are included or at least one of the mvd information and the mvp information is not included.

Figure 5:
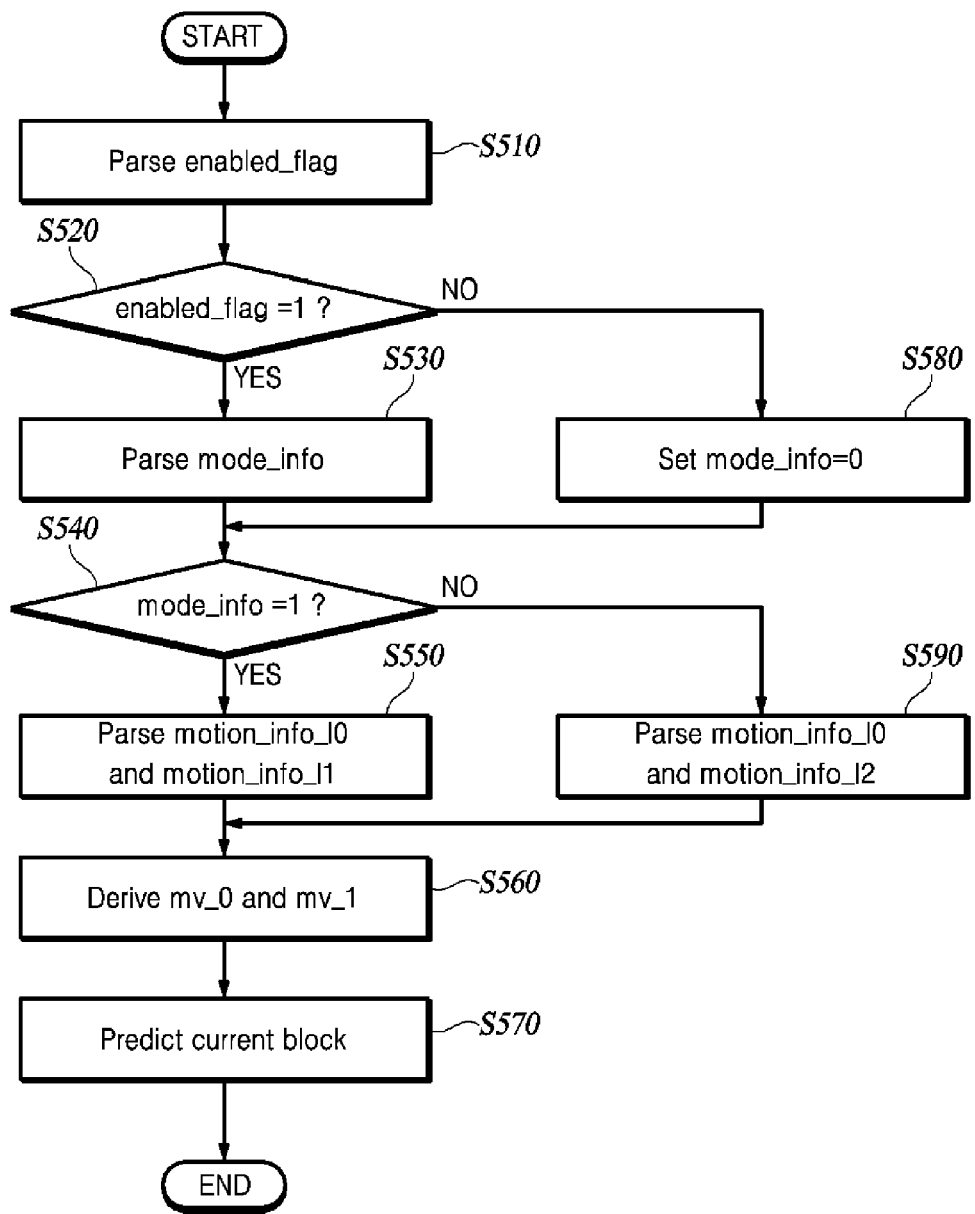
FIG. 5 is a diagram for describing bi-prediction according to an embodiment of the present invention.

An embodiment of the present invention for deducing the motion in the second direction is illustrated in FIG. 5.

The video encoding apparatus may signal mode information (mode_info) by including the mode information (mode_info) in the bitstream. The bi-prediction mode proposed by the present invention may include a first mode in which second motion information (motion_info_l1) is derived from the first motion information (motion_info_l0), a second mode in which third motion information (motion_info_l2) is derived using the signaled information, and the like.

mode_info may correspond to information for indicating any one of a plurality of prediction modes included in a plurality of bi-prediction modes. The mode_info may be implemented in various forms such as a flag or an index depending on the number of available bi-prediction modes. Hereinafter, it will be described under the assumption that the mode_info indicates the prediction mode used for the bi-prediction of the current block among the first mode and the second mode. Under this assumption, the mode_info may correspond to information indicating whether the first mode is applied to the current block. In addition, the case in which the mode_info does not indicate that the first mode is applied may be the same as indicating that the first mode is not applied or indicating that the second mode is applied.

When the mode_info indicates that the first mode is applied, the video encoding apparatus may signal the motion_info_l0 and the motion_info_l1 by including the motion_info_l0 and the motion_info_l1 in the bitstream. The motion_info_l0 may include differential motion vector information (mvd_l0) in the first direction and predicted motion vector information (mvp_l0_flag) in the first direction. The motion_info_l1 may include some of the mvd_l1 and the mvp_l1_flag (in other words, the motion_info_l1 may not include at least some of the mvd_l1 and the mvp_l1_flag). On the other hand, when the mode_info does not indicate that the first mode is applied (when the mode_info indicates that the second mode is applied), the video encoding apparatus may signal the motion_info_l0 and the motion_info_l2 by including the motion_info_l0 and the motion_info_l2 in the bitstream. motion_info_l2 may include both mvd_l1 and mvp_l1_flag.

The video decoding apparatus (decoding unit) may decode the mode_info from the bitstream (S530). When the mode_info indicates that the first mode is applied (S540), since the motion_info_l1 is included in the bitstream, the video decoding apparatus may decode the motion_info_l0 and the motion_info_l1 from the bitstream (S550).

The video decoding apparatus (prediction unit) may derive a first motion vector mv_l0 based on the motion_info_l0 and derive a second motion vector mv_l1 based on at least a part of motion_info_l0 and motion_info_l1 (S560). Since the motion_info_l0 includes the mvd_l0 and the mvp_l0_flag, the mv_l0 may be derived by summing the mvd_l0 and the mvp_l0 as in Equation 1 below.

$$(mvx_0, mvy_0) = (mrpx_0 \mp mvdx_0, mvpy_0 \mp mvdy_0) \qquad [\text{Equation 1}]$$

In Equation 1 above, $mvx_0$ denotes an x component of mv_l0, and $mvy_0$ denotes a y component of mv_l0. $mvpx_0$ denotes an x component of the mvp_l0, and $mvpy_0$ denotes a y component of the mvp_l0. $mvdx_0$ denotes an x component of the mvd_l0, and $mvdy_0$ denotes a y component of the mvd_l0.

Since the motion_info_l1 does not include at least a part of the mvd_l1 and the mvp_l1_flag, the mv_l1 may be derived based on the correlation of the motion. A detailed method of deducing mv_l1 will be described below.

The video decoding apparatus may use a first reference block indicated by the mv_l0 within a first reference picture (ref_l0) that is a reference picture in the first direction, and a second reference block indicated by the mv_l1 within a second reference picture (ref_l1) that is a reference picture in the second direction, thereby predicting the current block (generate the prediction block for the current block) (S570). ref_l0 and ref_l1 may be specified from reference picture information (ref_idx_l0 and ref_idx_l1) signaled from the video encoding apparatus or may be derived based on a POC difference between the reference pictures included in the reference picture list and the current picture. Specific embodiments thereof will be described below.

Meanwhile, when the mode_info does not indicate that the first mode is applied in operation S540 (when the mode_info indicates that the second mode is applied), since the motion_info_l2 is included in the bitstream, the video decoding apparatus may decode the motion_info_l0 and the motion_info_l2 from the bitstream (S590). In this case, the video decoding apparatus may derive the mv_l0 based on the motion_info_l0 and derive the mv_l1 based on the motion_info_l2 (S560). In addition, the video decoding apparatus may predict the current block by using the first reference block indicated by the mv_l0 and the second reference block indicated by the mv_l1 (S570).

According to an embodiment, the video encoding apparatus may signal enabled information (enabled_flag) by further including the enabled information (enabled_flag) in the bitstream. The enabled_flag may correspond to information indicating whether the first mode is enabled. The video encoding apparatus may encode the enabled_flag as a syntax of a high level such as sequence-level, picture-level, tile group-level, and slice-level, and signal the mode_info for each prediction unit (block) by including the mode_info for each prediction unit (block) in the bitstream when the enabled_flag indicates that the first mode is enabled. In this way, whether to apply the embodiments proposed in the present invention may be set for each block.

When the enabled_flag is encoded as the high level syntax and the mode_info is encoded in units of blocks, the video decoding apparatus may decode the enabled_flag from the high level syntax (S510) and decode the motion_info from the bitstream when the enabled_flag indicates that the first mode is enabled (S520) (S530). Meanwhile, when the enabled_flag indicate that the first mode is not enabled, the mode_info may not be decoded. In this case, the video decoding apparatus may not apply the first mode to the current block by setting or estimating the mode_info to or as "0" or "off" so as to indicate that the first mode is not applied (S580).

Hereinafter, various embodiments proposed by the present invention will be described according to whether some of the reference picture information (ref_idx_l0 and ref_idx_l1), the predicted motion vector information (mvp_l0_flag and mvp_l1_flag), and the differential motion vector information (mvd_l0 and mvd_l1) are included in the motion information In the embodiments described below, the motion_info_l0 may include the mvd_l0 and the mvp_l0_flag, and the motion_info_l1 may not include at least some of the mvd_l1 and the mvp_l1_flag. In other words, the motion_info_l0 may not include the ref_idx_l0, and the motion_info_l1 may not include one or more of the ref_idx_l1, mvd_l1 and the mvp_l1_flag.

First Embodiment

A first embodiment corresponds to a method of deducing motion information by deducing mvd_l1 when ref_idx_l0, mvd_l0, and mvp_l0 are all included in motion_info_l0, and ref_idx_l1 and mvp_l1 are included in motion_info_l1.

In the first embodiment, the mvd_l1 that is not signaled may be derived from the mvd_l0. The mvd_l1 may be derived based on a symmetric relationship established between the mvd_l1 and the mvd_l0. That is, the mvd_l1 may be set to or derived as a value (mvd_l1=−mvd_l0) symmetrical to the mvd_l0, and the mv_l1 may be derived using the derived mvd_l1 and the signaled mvp_l1 (Equation 2).

$$(mvx_1, mvy_1) = (mrpx_1 - mvdx_0, mvpy_1 - mvdy_0) \quad \text{[Equation 2]}$$

Figure 6:
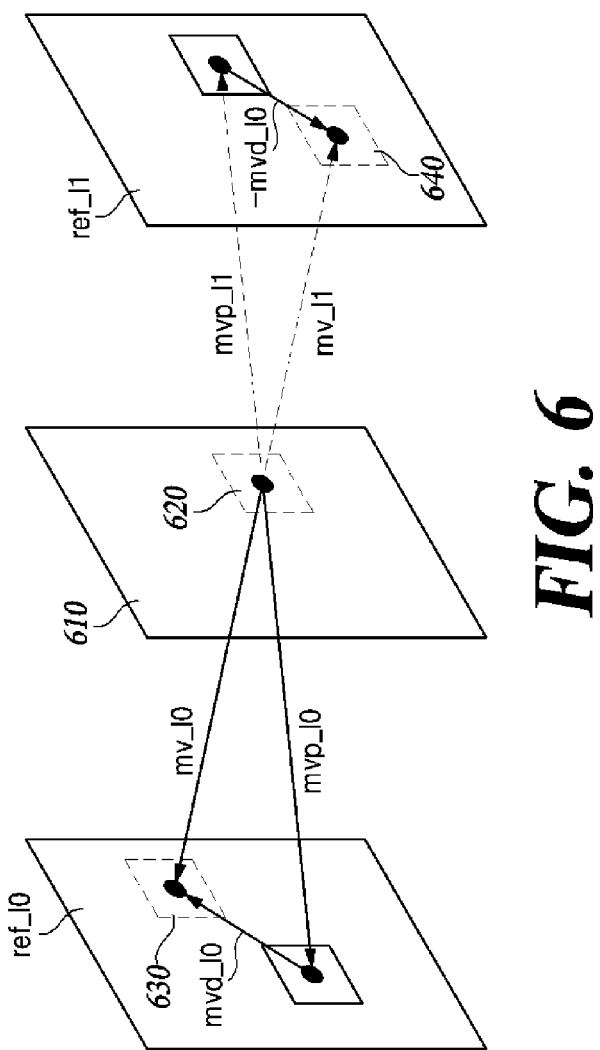
FIG. 6 is a diagram for describing derivation of motion using a symmetric relationship between differential motion vectors according to an embodiment of the present invention.
Figure 7:
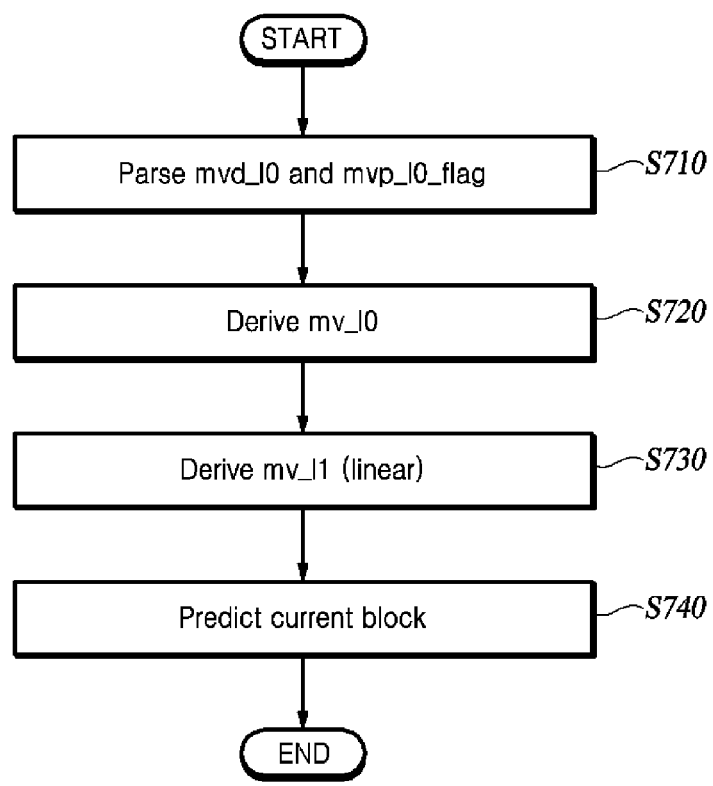
FIGS. 7 and 8 are diagrams for describing derivation of motion using a linear relationship according to an embodiment of the present invention.
Figure 8:
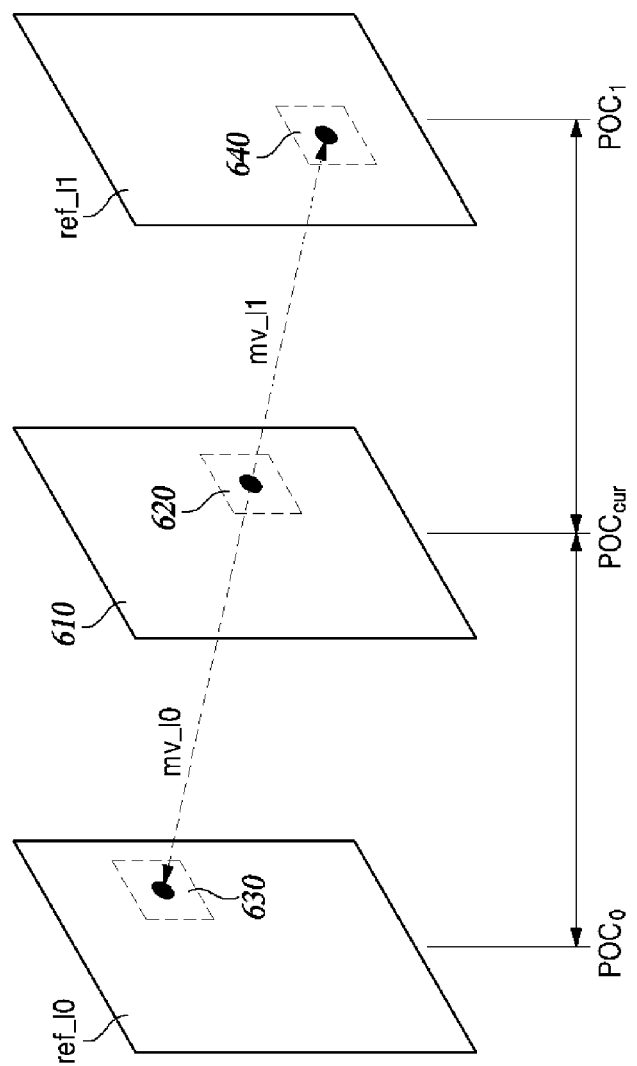

The video encoding apparatus may signal the motion_info_l0 and the motion_info_l1 (except mvd_l1) by including the motion_info_l0 and the motion_info_l1 (except mvd_l1) in the bitstream through the same processes as described above. As illustrated in FIG. 6, the video decoding apparatus may derive the mv_l0 by using the mvd_l0 and the mvp_l0 included in the motion_info_l0. In addition, the video decoding apparatus may derive the mv_l1 by using the mvd_l1 (−mvd_l0) derived from the mvd_l0 and the mvp_l1 included in the motion_info_l1.

The video decoding apparatus may use a first reference block 630 indicated by the mv_l0 within ref_l0 indicated by the ref_idx_l0 and a second reference block 640 indicated by the mv_l1 within ref_l1 indicated by the ref_idx_l1, thereby predicting a current block 620 located within a current picture 610.

Second Embodiment

A second embodiment corresponds to a method of deducing motion information by deducing ref_l0 and ref_l1 when ref_idx_l0 is not included in motion_info_l0 and ref_idx_l1 is not included in motion_info_l1.

In the second embodiment, the ref_l0 and the ref_l1 may be determined or derived as a reference picture having a $0^{th}$ index (positioned at a first location) among reference pictures included in a reference picture list or may be determined or derived based on a POC difference between the reference pictures included in the reference picture list and a current picture. Hereinafter, a method of deducing the ref_l0 and the ref_l1 based on the POC difference from the current picture will be described.

The video decoding apparatus may select any one of the reference pictures included in the reference picture list in a first direction and set the selected reference picture as ref_l0, based on a difference in POC values between reference pictures included in reference picture list 0 (reference picture list in a first direction) and the current picture. For example, the video decoding apparatus may set a reference picture (closest reference picture) having the smallest POC value difference from the current picture as the ref_l0.

In addition, the video decoding apparatus may select any one of reference pictures included in a reference picture list in a second direction and set the selected reference picture as ref_l1, based on a difference in POC values between reference pictures included in reference picture list 1 (reference picture list in a second direction) and the current picture. For example, the video decoding apparatus may set a reference picture (closest reference picture) having the smallest POC value difference from the current picture as the ref_l1.

The video decoding apparatus may compare the POC values of the reference pictures included in the reference picture list with the POC value of the current picture sequentially or in parallel to select any one reference picture. When the closest reference picture is selected by sequentially comparing the reference pictures included in the reference picture list, the video decoding apparatus may virtually set the index value of the reference picture to an index value (for example, −1) not assigned to the reference picture list and then sequentially compare the reference pictures.

The reference picture selected from the reference picture list in the first direction and the reference picture selected from the reference picture list in the second direction may have forward or backward POC values with respect to the POC value of the current picture. That is, the reference picture selected from the reference picture list in the first direction and the reference picture selected from the reference picture list in the second direction may be composed of a pair of the forward reference picture and the backward reference picture.

When the ref_l0 and the ref_l1 are derived, the video decoding apparatus may use a first reference block 630 indicated by mv_l0 in the ref_l0 and a second reference block 640 indicated by mv_l1 in the ref_l1 to predict the current block.

According to an embodiment, the process of determining the ref_l0 and the ref_l1 may be performed at a high level which is upper than a level of the current block. That is, among the elements included in the motion_info_l0 and the motion_info_l1, the remaining elements excluding the ref_l0 and the ref_l1 may be derived or determined in units of blocks, and the ref_l0 and the ref_l1 may be determined in units of high levels. Here, the high level may be an upper level than the block level, such as picture-level, tile group-level, slice-level, tile-level, and coding tree unit (CTU)-level.

The second embodiment may be implemented in combination with the first embodiment described above or embodiments to be described below. That is, although it has been described that the ref_idx_l0 and the ref_idx_l1 are signaled in the first embodiment, when the second embodiment is applied, the ref_idx_l0 and the ref_idx_l1 are not signaled in the first embodiment, and accordingly the video decoding apparatus may derive the ref_l0 and the ref_l1 by itself.

Third Embodiment

A third embodiment corresponds to a method of deducing second motion information from first motion information based on a linear relationship established between motion in a first direction and motion in a second direction.

The video encoding apparatus may signal motion_info_l0 to the video decoding apparatus by including the motion_info_l0 in the bitstream. The motion_info_l0 may include mvp_l0_flag, mvd_l0, and/or ref_idx_l0. Information included in the motion_info_l0 may be different for each embodiment to be described later.

The video decoding apparatus may decode the motion_info_l0 from the bitstream (S710). The video decoding apparatus may deduce or derive the mv_l0 by using the mvp_l0_flag and the mvd_l0 (S720). The mv_l0 may be derived by adding the mvp_l0 and the mvd_l0 as in Equation 1 described above. Here, the mvp_l0 may correspond to a motion vector of a neighboring block indicated by the decoded mvp_l0_flag.

When the mv_l0 is derived, the video decoding apparatus may derive mv_l1 by using ref_l0, ref_l1, and the mv_l0 (S730). The derived mv_l1 may correspond to a motion vector having a linear relationship with the mv_l0. The ref_l0 may be a reference picture indicated by the ref_idx_l0 signaled from the video encoding apparatus or a separately defined reference picture. In addition, the ref_l1 may be a reference picture indicated by ref_idx_l1 signaled from the video encoding apparatus or a separately defined reference picture.

The mv_l1 may be derived by applying a proportional relationship between "the difference in POC values between the current picture 610 and the ref_l0" and "the difference in POC values between the current picture 610 and the ref_l1" to the mv_l0 as shown in Equation 3 below.

$$(mvx_1, mvy_1) = \frac{POC_{cur} - POC_1}{POC_{cur} - POC_0} \times (mvx_0, mvy_0) \quad \text{[Equation 3]}$$

In Equation 3, $mvx_1$ denotes an x component of the mv_l1, and $mvy_1$ denotes a y component of the mv_l1. $POC_0$ denotes a POC value of the ref_l0, $POC_1$ denotes the POC value of the ref_l1, and $POC_{curr}$ denotes the POC value of the current picture 610 including the current block 620. In addition, $POC_{curr}-POC_0$ denotes a difference in POC values between the ref_l0 and the current picture 610, and $POC_{curr}-POC_1$ denotes a difference in POC values between ref_l1 and the current picture 610.

When the mv_l1 is derived, the video decoding apparatus may predict the current block 620 based on the first reference block 630 indicated by the mv_l0 and the second reference block 640 indicated by the mv_l1 (S740).

According to an embodiment, various embodiments proposed by the present invention may use a syntax element (for example, linear_MV_coding_enabled_flag) indicating enable/disable and/or a syntax element (for example, linear_MV_coding_flag or linear_MV_coding_idc) indicating a linear relationship of the motion to determine whether to apply to the current block 620. Here, the syntax element indicating the enable/disable may correspond to the above-described enabled information, and the syntax element indicating the linear relationship may correspond to the above-described mode information.

The linear_MV_coding_enabled_flag is the high-level syntax and may be defined at one or more locations among the sequence-level, the picture-level, the tile group-level, and the slice-level. The linear_MV_coding_flag may be signaled for each block corresponding to the decoding target.

When linear_MV_coding_enabled_flag=1, whether to apply the embodiments proposed in the present invention may be set for each block by signaling the linear_MV_coding_flag for each prediction unit. When the linear_MV_coding_flag=1, some or all of the motion_info_l1 is not signaled, and may be derived using the signaled motion_info_l0 (first mode). When the linear_MV_coding_flag=0, the motion_info_l1 may be signaled as in the conventional method (second mode).

Hereinafter, various embodiments of the present invention will be described on the premise that the linear_MV_coding_enabled_flag is defined as activation of a function at a high-level and the linear_MV_coding_flag is set for each block.

Embodiment 3-1

Embodiment 3-1 corresponds to a method in which mvp_l1_flag and mvd_l1 of motion_info_l1 are not signaled during bi-prediction and are derived from motion_info_l0 using a linear relationship of motion.

When the second direction is direction L0, motion information in direction L0 may be derived from mvd and mvp in direction L1 and bidirectional reference pictures by using a linear relationship of motion. That is, the mvp information and the mvd information in direction L0 are not signaled. When the second direction is direction L1, motion information in direction L1 may be derived from mvd and mvp in direction L0 and bidirectional reference pictures by using a linear relationship of motion. That is, the mvp information and the mvd information in direction L1 are not signaled.

When the motion vector in direction L1 is derived using the linear relationship (the latter case), the information signaled from the video encoding apparatus to the video decoding apparatus is expressed in syntax as shown in Table 4 below.

TABLE 4

| | |
|---|---|
| prediction direction information (bi-prediction) | inter_pred_idc |
| reference picture information (for L0 and L1) | ref_idx_l0, ref_idx_l1 |
| mvp information (for L0) | mvp_l0_flag |
| mvd (for L0) | mvd_l0 (abs_mvd_greater0_flag, abs_mvd_greater1_flag, abs_mvd_minus2, mvd_sign_flag) |

As shown in Table 4, motion_info_l0 may be signaled from the video encoding apparatus to the video decoding apparatus by being included in the bitstream. The signaled motion_info_l0 may include ref_idx_l0, mvd_l0, and mvp_l0_flag. ref_idx_l1 may also be signaled by being included in the bitstream. In Embodiment 3-1, reference pictures (ref_l0 and ref_l1) for deriving mv_l1 correspond to reference pictures indicated by ref_idx_l0 and ref_idx_l0 signaled from the video encoding apparatus.

When the motion_info_l0 is decoded (S910), the video decoding apparatus may deduce or derive the mv_l0 by using the decoded mvp_l0_flag and the mvd_l0 (S920). Equation 1 may be used in this process. Also, the ref_idx_l1 may be decoded from the bitstream (S930).

The video decoding apparatus may determine whether the motion vector derivation function is activated/deactivated using the linear_MV_coding_enabled_flag (S940). When the linear_MV_coding_enabled_flag indicates the activation of the motion vector derivation function, linear_MV_coding_flag may be decoded from the bitstream to determine whether the derivation function proposed by the present invention is applied (S950).

When the decoded linear_MV_coding_flag indicates that a linear relationship of motion is established (S960), the video decoding apparatus may derive mv_l1 on the premise that a linear relationship between the mv_l0 and the mv_l1 is established (S970). The process of deriving the mv_l1 may be implemented by applying each of the reference pictures ref_l0 and ref_l1 and the mv_l0 in each direction to Equation 3.

Meanwhile, when the linear_MV_coding_enabled_flag indicates the deactivation of the motion vector derivation function in operation S940 or the linear_MV_coding_flag does not indicate that the linear relationship of the motion is established in operation S960, the mv_l1 may be derived through the second mode, not the first mode. Specifically, the video decoding apparatus may decode the mvp_l1_flag and the mvd_l1 from the bitstream (S980 and S990), and derive the mv_l1 by using the mvp_l1_flag and the mvd_l1 (S992).

The syntax elements for Embodiment 3-1 described above are expressed in Table 5 below.

TABLE 5

| | Descriptor |
|---|---|
| prediction_unit( x0, y0, nPbW, nPbH ) { | |
| ... | |
|   if( tile_group_type == B ) | |
|     inter_pred_idc[ x0 ][ y0 ] | ae(v) |
|   if( inter_pred_idc[ x0 ][ y0 ] != PRED_L1 ) { | |
|     if( num_ref_idx_l0_active_minus1 > 0 ) | |
|       ref_idx_l0[ x0 ][ y0 ] | ae(v) |
|     mvd_coding( x0, y0, 0 ) | |
|     mvp_l0_flag[ x0 ][ y0 ] | ae(v) |
|   } | |
|   if(inter_pred_idc[ x0 ][ y0 ] != PRED_L0 ) { | |
|     if( num_ref_idx_l1_active_minus1 > 0 ) | |
|       ref_idx_l1[ x0 ][ y0 ] | ae(v) |
|     if( linear_MV_coding_enabled_flag & inter_pred_idc[ x0 ][ y0 ] != PRED_L1 ) | |
|       linear_MV_coding_flag | |
|     if( !linear_MV_coding_flag ) { | |
|       mvd_coding( x0, y0, 1 ) | |
|       mvp_l1_flag[ x0 ][ y0 ] | ae(v) |
|     } | |
|   } | |
| } | |

Figure 9:
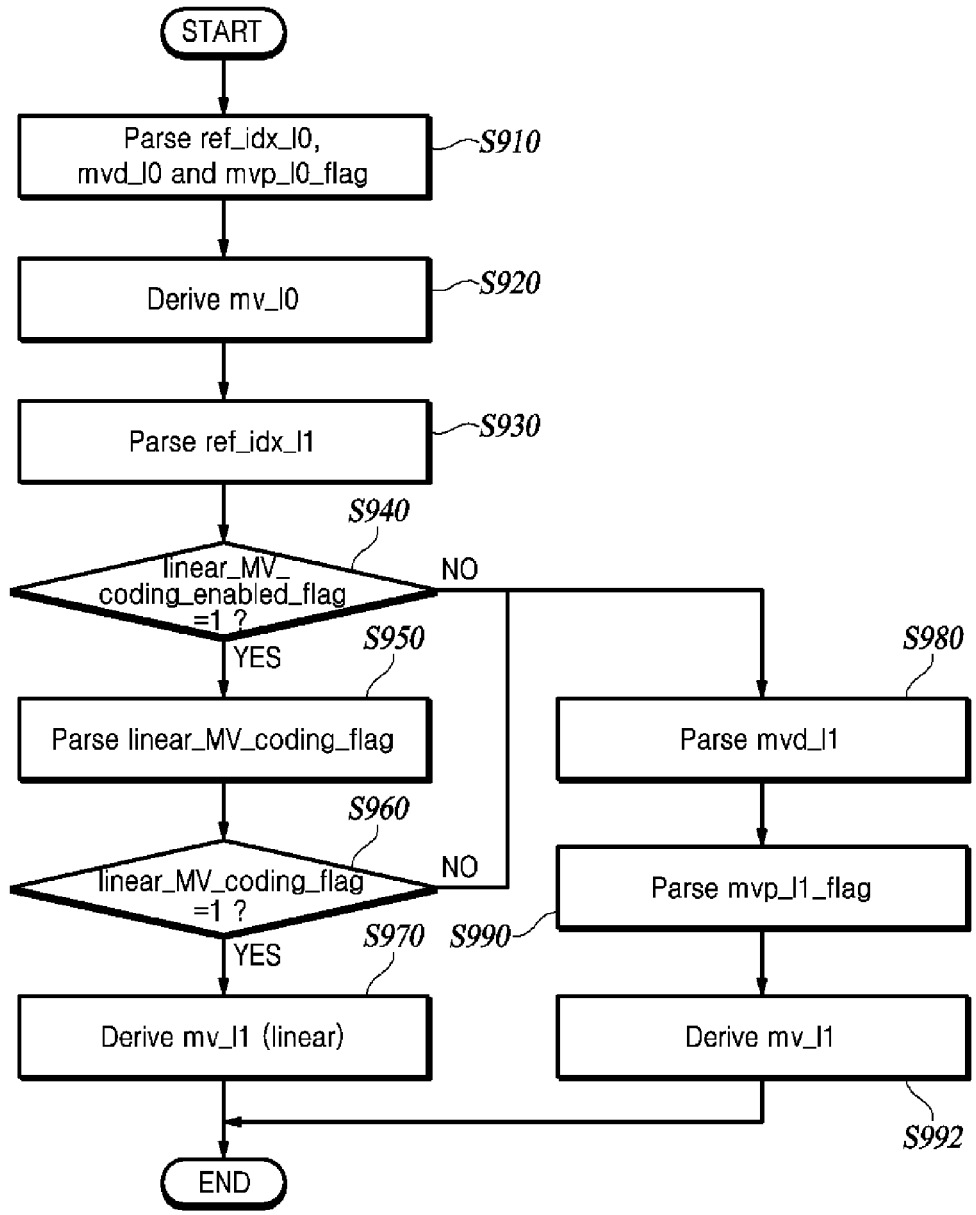
FIGS. 9 to 18 are diagrams for describing derivation of motion according to various embodiments of the present invention.

FIG. 9 illustrates that the operation of determining the linear_MV_coding_enabled_flag (S940) and the operation of decoding and determining the linear_MV_coding_flag (S950 and S960) may be performed after the operation of decoding the ref_idx_l1 (S930), but the operations S940 to S960 may be performed before the operation of decoding the motion_info_l0 (S910).

Figure 10:
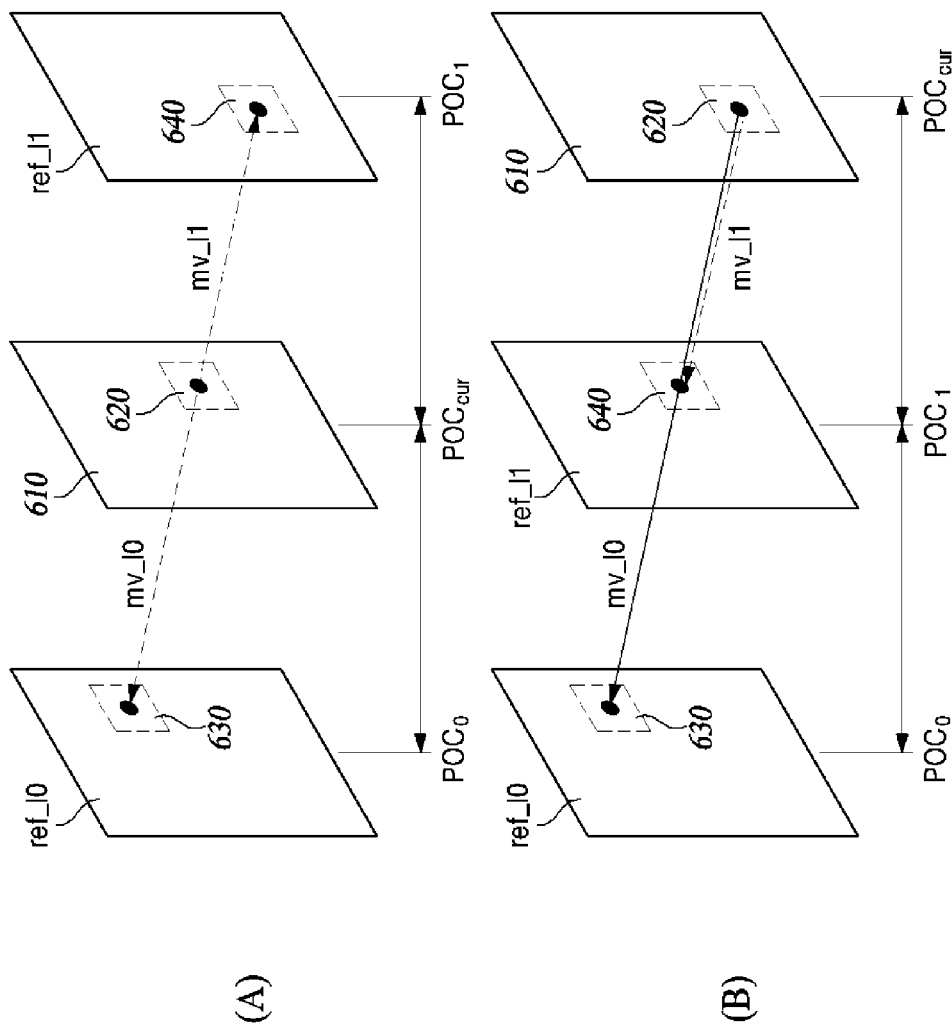

Examples of deducing the mv_l1 based on Embodiment 3-1 are illustrated in FIG. 10. FIGS. 10A and 10B each illustrate two types of the current picture 610 and the reference pictures ref_l0 and ref_l1 according to the magnitudes of the POC values in the bi-prediction. The embodiments to be described below may be applied to the two types illustrated in FIG. 10.

In the bi-prediction, as illustrated in FIG. 10A, the current picture 610 may be located between the reference pictures (ref_l0 and ref_l1) based on the POC value (i.e., ($POC_0 < POC_{cur}$) & ($POC_{cur} < POC_1$)). In addition, as illustrated in FIG. 10B, the bi-prediction may include a case that the POC value of the current picture 610 is greater than the POC values of the reference pictures ref_l0 and ref_l1 based on the POC value (i.e., ($POC_0 < POC_{cur}$) & ($POC_1 < POC_{cur}$)). Here, the $POC_0$ indicates a POC value of the ref_l0, the $POC_1$ indicates a POC value of the ref_l1, and the $POC_{cur}$ indicates a POC value of the current picture 610.

In both types of bi-prediction, the mv_l1 may be derived on the premise that the linear relationship is established between the mv_l0 (solid arrow) and the mv_l1 (dotted arrow). In this process, the mv_l0 and the reference pictures ref_l0 and ref_l1 in each direction may be used. When the mv_l1 is derived, the current block 620 may be predicted based on the reference block 630 indicated by the mv_l0 and the reference block 640 indicated by the derived mv_l1.

Embodiment 3-2

Embodiment 3-2 corresponds to a method of deducing mv_l1 based on a linear relationship of motion and then correcting or adjusting the mv_l1. Embodiment 3-2 is the same as Embodiment 3-1 in that the motion vector is derived based on the linear relationship of motion, but is different from Embodiment 3-1 in that the mv_l1 is additionally corrected or adjusted using offset information.

The offset information for the motion correction corresponds to information indicating a difference between the mv_l1 and the "adjusted mv_l1." In other words, the offset information corresponds to information indicating the difference between the motion vector (mv_l1) derived using the linear relationship of motion and the measured (actual) motion vector (adjusted mv_l1) of the current block.

The offset information may include an offset vector or an offset index. The offset vector corresponds to information for indicating the position indicated by the "adjusted mv_l1" relative to a position indicated by the mv_l1. The offset index corresponds to information obtained by indexing candidates that may correspond to the offset vector. Hereinafter, each of the two types of offset information will be described through separate embodiment.

Offset Vector

In addition to motion_info_l0, an offset vector may be signaled by being further included in the bitstream. As described above, since the offset vector corresponds to a difference value between the adjusted mv_l1 and (unadjusted) mv_l1, the offset vector may be expressed as a motion vector difference (mvd). In addition, since the offset vector corresponds to the difference between the motion vector derived using the linear relationship of motion and the measured motion vector of the current block, the offset vector may be distinguished from the mvd (the difference between mvp derived from the motion vector of the neighboring block and mv of the current block) used in the conventional method. In this embodiment, the information signaled from the video encoding apparatus to the video decoding apparatus for the bi-prediction is expressed in syntax as shown in Table 6 below.

TABLE 6

| prediction direction information (bi-prediction) | inter_pred_idc |
|---|---|
| reference picture information (for L0 and L1) | ref_idx_l0, ref_idx_l1 |
| mvp information (for L0) | mvp_l0_flag |
| mvd (for L0) | mvd_l0 (abs_mvd_greater0_flag, abs_mvd_greater1_flag, abs_mvd_minus2, mvd_sign_flag) |
| mvd (for L1) | mvd_l1 (abs_mvd_greater0_flag, abs_mvd_greater1_flag, abs_mvd_minus2, mvd_sign_flag) |

In Table 6 above, mvd_l1 may be the mvd or the offset vector used in the conventional method. With respect to the current block 620, when the linear relationship of motion is not established, the mvd used in the conventional method may be signaled as the mvd_l1, and when the linear relationship of motion is established, the offset vector may be signaled as the mvd_l1.

As shown in Table 6, the motion_info_l0 may be signaled from the video encoding apparatus to the video decoding apparatus. The signaled motion_info_l0 may include ref_idx_l0, mvd_l0, and mvp_l0_flag as shown in Table 6. ref_idx_l1 may also be signaled by being included in a bitstream.

The video decoding apparatus sets reference pictures indicated by the signaled reference picture information (ref_idx_l0 and ref_idx_l1) as reference pictures (ref_l0 and ref_l1) for deducing the mv_l1 (for predicting the current block).

When the motion_info_l0 is decoded (S1110), the video decoding apparatus may deduce or derive the mv_l0 by using the mvp_l0_flag and the mvd_l0 (S1120). Equation 1 may be used in this process. Also, the video decoding apparatus may decode ref_idx_l1 and mvd_l1 from the bitstream (S1130 and S1140). Here, the mvd_l1 may correspond to any one of the mvd of the conventional method and an offset vector, depending on whether the linear relationship is established.

The video decoding apparatus may determine whether the motion vector derivation function is activated/deactivated using linear_MV_coding_enabled_flag (S1150). When the linear_MV_coding_enabled_flag indicates the activation of the motion vector derivation function, linear_MV_coding_flag may be decoded from the bitstream (S1160).

When the linear_MV_coding_flag indicates that the linear relationship of motion is established (S1170), the video decoding apparatus may derive mv_l1 on the premise that the linear relationship of motion is established (S1180). This process may be implemented by applying the reference pictures (ref_l0 and ref_l1) and mv_l0 to Equation 3.

The video decoding apparatus may adjust or correct the mv_l1 by applying the offset vector (mvd_l1) to the derived mv_l1 (S1182). Specifically, the mv_l1 may be adjusted such that the adjusted mv_l1 indicates a position which is shifted by the offset vector mvd_l1 having a position indicated by mv_l1 as an origin. The adjustment of the mv_l1 may be understood as, under assumption that the derived mv_l1 is a predicted motion vector (mvp) in a second direction, applying the offset vector (mvd_l1) to the assumed predicted motion vector.

Meanwhile, when the linear_MV_coding_enabled_flag indicates the deactivation of the motion vector derivation function in operation S1150 or the linear_MV_coding_flag does not indicate that the linear relationship of motion is established in operation S1170, the video decoding apparatus may derive the mv_l1 through the conventional method, not the derivation method proposed in the present invention. Specifically, the video decoding apparatus may decode mvp_l1_flag (S1190), and derive the mv_l1 by summing the mvp_l1 indicated by the mvp_l1_flag and the mvd_l1 decoded in S1140 (S1192). Here, the mvd_l1 corresponds to the mvd used in the conventional method.

The syntax elements for the embodiments described above are shown in Table 7 below.

TABLE 7

```
prediction_unit( x0, y0, nPbW, nPbH ) {                                              Descriptor
 ...
    if( tile_group_type = = B )
        inter_pred_idc[ x0 ][ y0 ]                                                   ae(v)
        if( inter_pred_idc[ x0 ][ y0 ] != PRED_L1 ) {
            if( num_ref_idx_l0_active_minus1 > 0 )
                ref_idx_l0[ x0 ][ y0 ]                                               ae(v)
            mvd_coding ( x0, y0, 0 )
            mvp_l0_flag[ x0 ][ y0 ]                                                  ae(v)
        }
        if(inter_pred_idc[ x0 ][ y0 ] != PRED_L0 ) {
            if( num_ref_idx_l1_active_minus1 > 0 )
                ref_idx_l1[ x0 ][ y0 ]                                               ae(v)
            mvd_coding( x0, y0, 1 )
            if( linear_MV_coding_enabled_flag & inter_pred_idc[ x0 ][ y0 ] != PRED_L1 )
                linear_MV_coding_flag
            if( !linear_MV_coding_flag )
                mvp_l1_flag[ x0 ][ y0 ]                                              ae(v)
        }
}
```

TABLE 8

| prediction direction information (bi-prediction) | inter_pred_idc |
|---|---|
| reference picture information (for L0 and L1) | ref_idx_l0, ref_idx_l1 |
| mvp information (for L0) | mvp_l0_flag |
| mvd (for L0) | mvd_l0 (abs_mvd_greater0_flag, abs_mvd_greater1_flag, abs_mvd_minus2, mvd_sign_flag) |
| offset index (for L1) | mv_offset |

Figure 11:
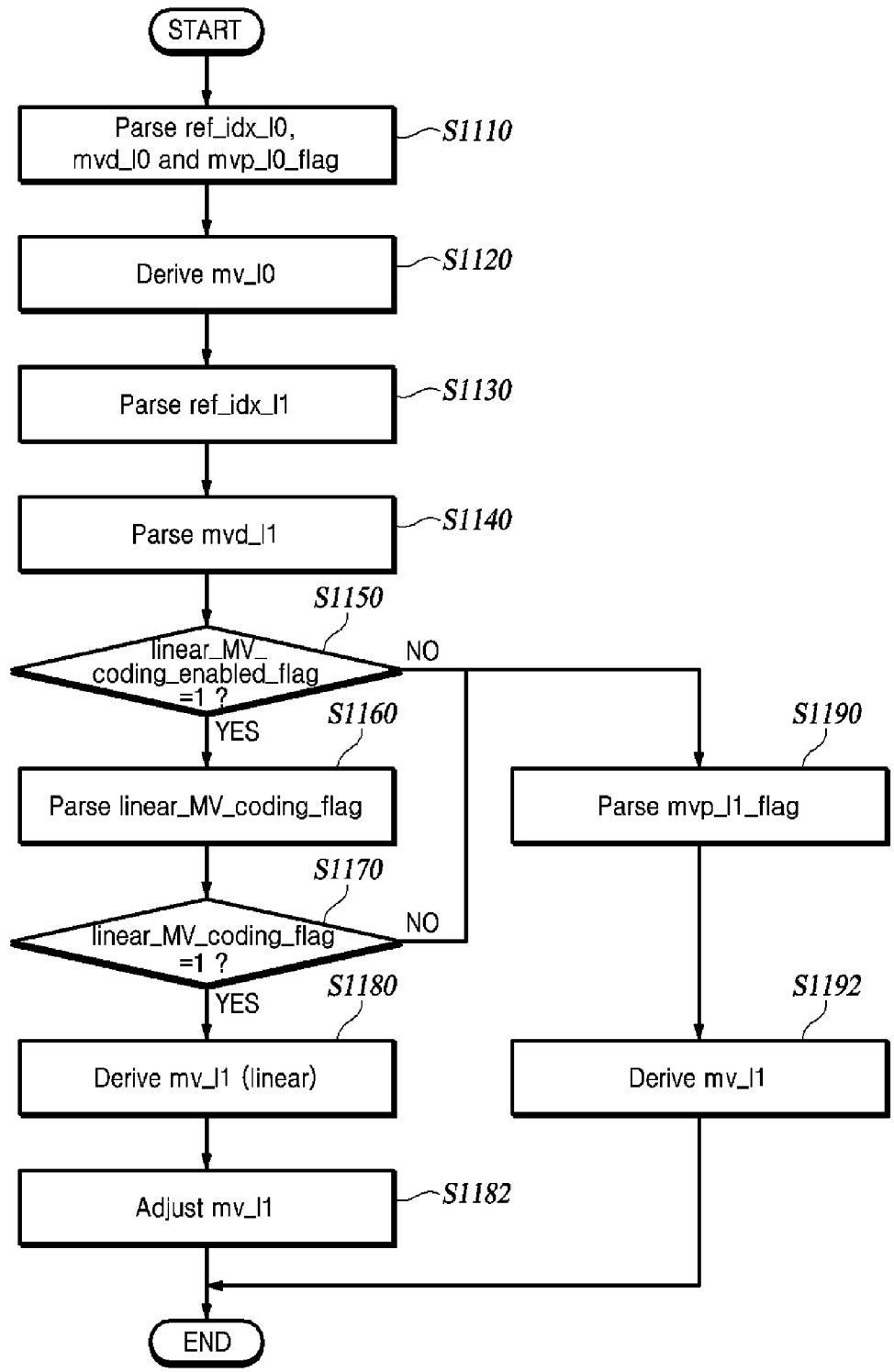

In Table 8 above, mv_offset indicates a syntax element corresponding to the offset index. The motion_info_l0 may be signaled from the video encoding apparatus to the video FIG. 11 illustrates that the operation of determining the linear_MV_coding_enabled_flag (S1150) and the operation of decoding and determining the linear_MV_coding_flag (S1160 and S1170) are performed after the operation of decoding the mvd_l1 (S1140), but the operations S1150 to S1170 may be performed before the operation of decoding the motion_info_l0 (S1110).

Figure 12:
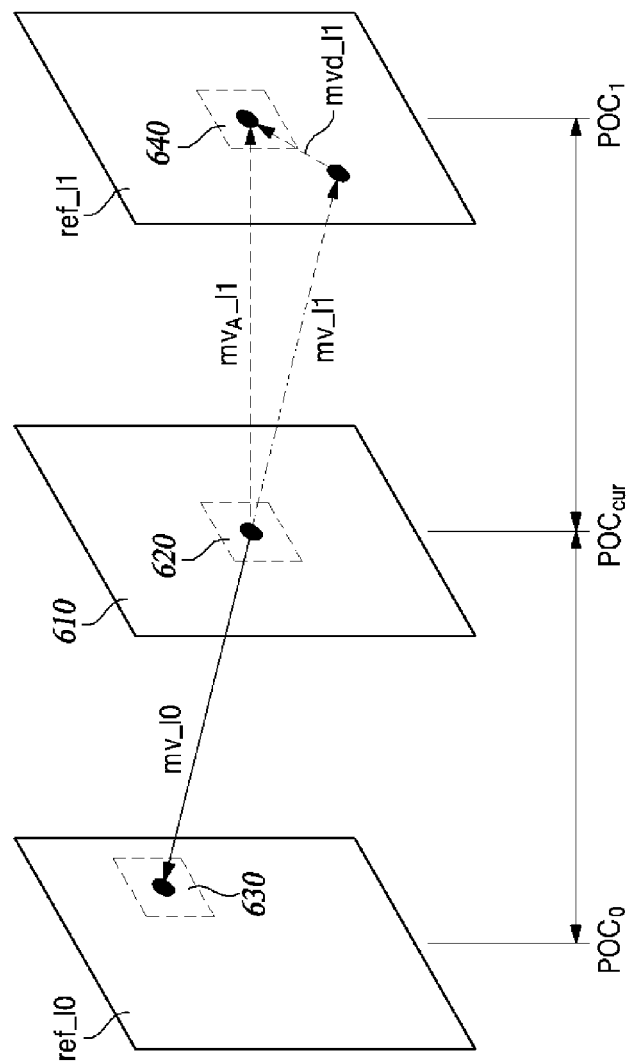

An example of deriving the mv_l1 based on the present embodiment is illustrated in FIG. 12. As illustrated in FIG. 12, the mv_l1 may be derived on the premise that the linear relationship is established between the mv_l0 (solid arrow) and the mv_l1 (dash-dotted arrow).

Further, assuming that the derived mv_l1 is the predicted motion vector, the mv_l1 may be adjusted by moving the position indicated by the mv_l1 according to the direction and magnitude indicated by the offset vector mvd_l1. The current block 620 may be predicted based on the reference block 630 indicated by the mv_l0 and the reference block 640 indicated by the adjusted second motion vector ($mv_A\_l1$).

Offset Index

In addition to the motion_info_l0, an offset index may be signaled by being further included in the bitstream. As described above, the offset index corresponds to an index indicating any one of one or more preset offset vector candidates (candidates that may correspond to the offset vector).

In this embodiment, the information signaled from the video encoding apparatus to the video decoding apparatus for the bi-prediction is expressed in syntax as shown in Table 8 below.

decoding apparatus by being included in the bitstream. The signaled motion_info_l0 may include ref_idx_l0, mvd_l0, and mvp_l0_flag as shown in Table 8. ref_idx_l1 may also be signaled by being included in the bitstream. The video decoding apparatus sets the reference pictures indicated by the signaled reference picture information ref_idx_l0 and ref_idx_l1 as the reference pictures ref_l0 and ref_l1 for deducing the mv_l1.

When the motion_info_l0 is decoded (S1310), the video decoding apparatus may deduce or derive the mv_l0 by using the mvp_l0_flag and the mvd_l0 included in the motion_info_l0 (S1320). Equation 1 may be used in this process. Also, the video decoding apparatus may decode the ref_idx_l1 (S1330).

The video decoding apparatus may determine whether the motion vector derivation function is activated or deactivated by analyzing the linear_MV_coding_enabled_flag (S1340). When the linear_MV_coding_enabled_flag indicates the activation of the motion vector derivation function, the linear_MV_coding_flag may be decoded from the bitstream (S1350).

When the linear_MV_coding_flag indicates that the linear relationship of motion is established (S1360), the video decoding apparatus decodes an offset index mv_offset (S1370) and may derive the mv_l1 on the premise that the linear relationship between the mv_l0 and the mv_l1 is established (S1380). This process may be implemented by applying the mv_l0 and the bidirectional reference pictures (ref_l0 and ref_l1) to Equation 3.

The video decoding apparatus may adjust or correct the mv_l1 by applying an offset vector candidate indicated by the offset index (mv_offset) to the derived mv_l1 (S1382).

Specifically, the mv_l1 may be adjusted by adding an offset vector candidate indicated by the offset index (mv_offset) to the mv_l1. In other words, the adjustment of the mv_l1 may be understood as, under assumption that the derived mv_l1 is the predicted motion vector (mvp) in the second direction, applying the offset vector candidate indicated by the offset index (mv_offset) to the assumed predicted motion vector.

Meanwhile, when the linear_MV_coding_enabled_flag indicates the deactivation of the motion vector derivation function in operation S1340 or the linear_MV_coding_flag does not indicate that the linear relationship of motion is established in operation S1360, the mv_l1 may be derived through the conventional method, not the derivation method proposed in the present invention. Specifically, the video decoding apparatus may decode the mvd_l1 and the mvp_l1_flag from the bitstream (S1390 and S1392), and derive the mv_l1 by summing the mvp_l1 indicated by the mvp_l1_flag and the mvd_l1 (S1394).

The syntax elements for the embodiments described above are shown in Table 9 below.

FIG. 14D illustrates another example of the case where the motion of the 16-point offset is allowed. The 16-point offset vector candidates can be configured by combining 8-point offset vector candidates filled with a horizontal pattern and 8-point offset vector candidates filled with a diagonal pattern. When the motion of the 16-point offset is allowed, any one of the offset vector candidates may be indicated using an offset index of a 4-bit fixed length.

Figure 14:
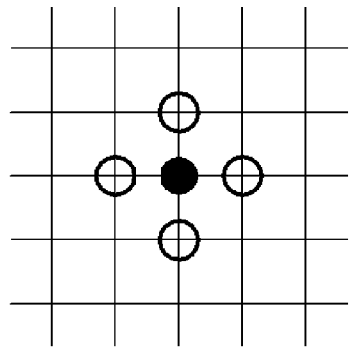
Figure 14:
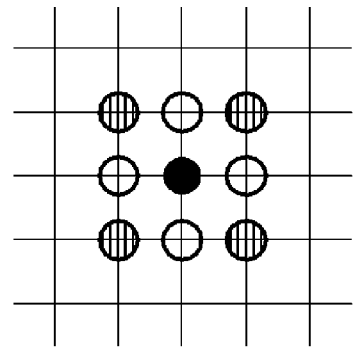
Figure 14:
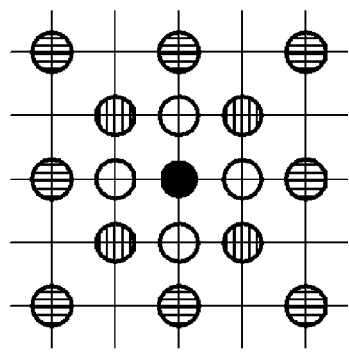
Figure 14:
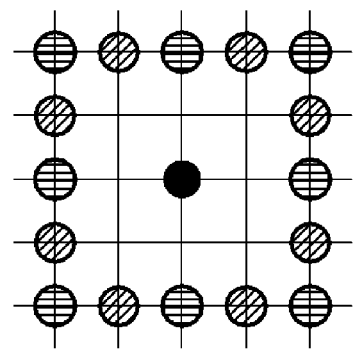

Which of the various types of offset vector candidates described with reference to FIG. 14 is set may be determined or defined at one or more positions of a picture-level header, a tile group header, a tile header, and/or a CTU header. That is, the shape of the offset vector candidate may be determined using the information (identification information) signaled from the video encoding apparatus, and the identification information may be defined in various positions described above. Since any one of various types of offset vector candidates is determined or identified by the identification information, the number of offset vector candidates,

TABLE 9

| prediction_unit( x0, y0, nPbW, nPbH ) { | Descriptor |
|---|---|
| ... | |
|   if( inter_pred_idc[ x0 ][ y0 ] != PRED_L0 ) { | |
|     if( num_ref_idx_l1_active_minus1 > 0 ) | |
|       ref_idx_l1[ x0 ][ y0 ] | ae(v) |
|     if( linear_MV_coding_enabled_flag & inter_pred_idc[ x0 ][ y0 ] != PRED_L1 ) | |
|       linear_MV_coding_flag | |
|     if( !linear_MV_coding_flag ) { | |
|       mvd_coding( x0, y0, 1 ) | |
|       mvp_l1_flag[ x0 ][ y0 ] | ae(v) |
|     } | |
|     else | |
|       mv_offset[ x0 ][ y0 ] | |
|   } | |
| } | |

Figure 13:
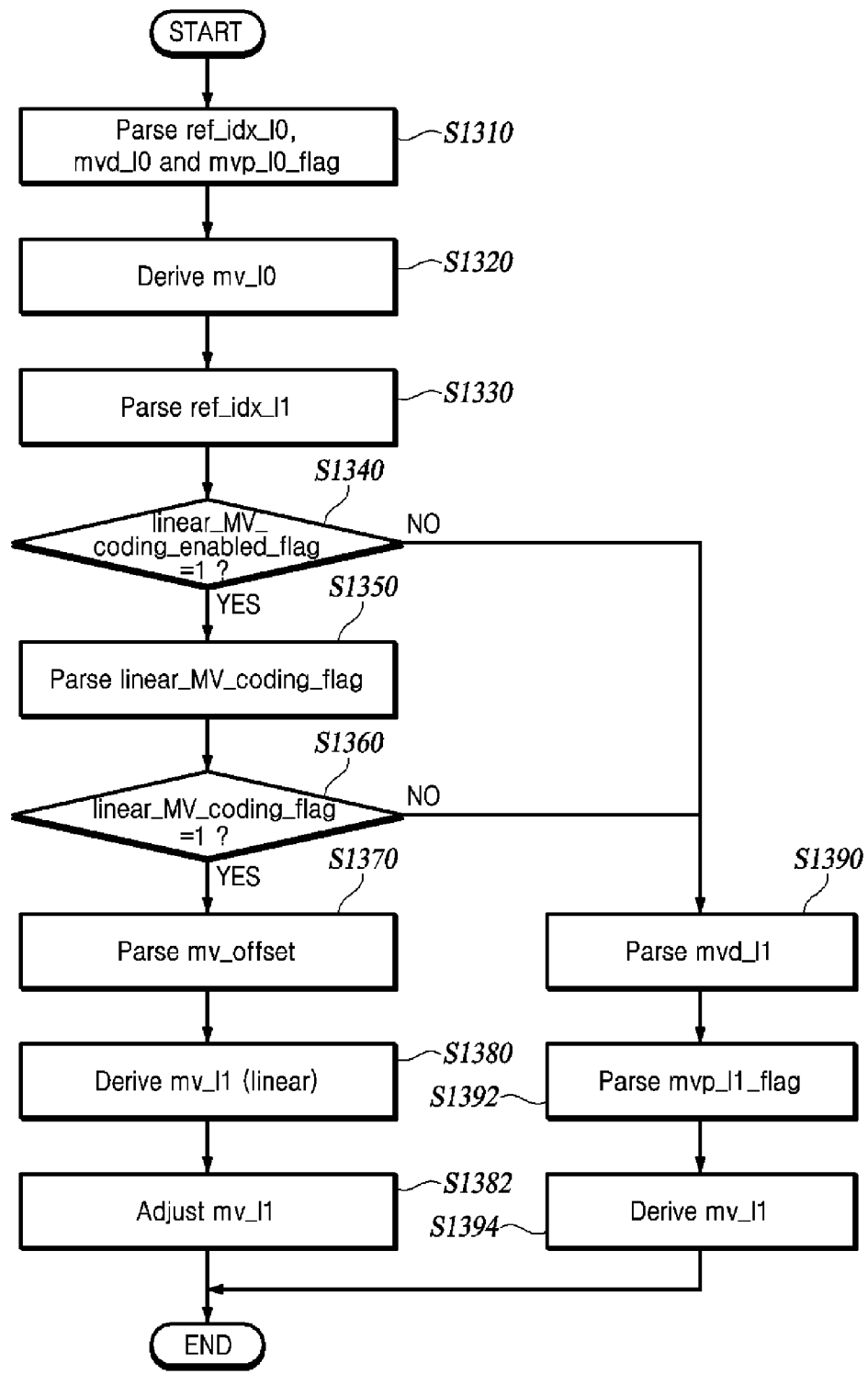

FIG. 13 illustrates that the operation of determining the linear_MV_coding_enabled_flag (S1340) and the operation of decoding and determining the linear_MV_coding_flag (S1350 and S1360) are performed after the operation of decoding the ref_idx_l1 (S1330), but the operations S1340 to S1360 may be performed before the operation of decoding the motion_info_l0 (S1310).

Various types of offset vector candidates used in this embodiment are illustrated in FIG. 14. FIG. 14A illustrates the offset vector candidates (a circle with an empty interior) when a motion of 4-point offset is allowed. The filled circle represents the mv_l1 derived based on the linear relationship of motion. When the motion of the 4-point offset is allowed, any one of the offset vector candidates may be indicated using an offset index of a 2-bit fixed length (FL).

FIG. 14B illustrates the offset vector candidates when a motion of 8-point offset is allowed. The 8-point offset vector candidates may be configured by adding four offset vector candidates (a circle filled with a vertical pattern) to the 4-point offset vector candidates. When the motion of the 8-point offset is allowed, any one of the offset vector candidates may be indicated using an offset index of a 3-bit fixed length.

FIG. 14C illustrates the offset vector candidates when a motion of 16-point offset is allowed. The 16-point offset vector candidates may be configured by adding eight offset vector candidates (a circle filled with a horizontal pattern) to the 8-point offset vector candidates. When the motion of the 16-point offset is allowed, any one of the offset vector candidates may be indicated using an offset index of a 4-bit fixed length.

the magnitudes of each candidate, and the directions of each candidate may be determined by the identification information.

In addition, which of various types of offset vector candidates is set may be determined in advance by using the same rule at the video encoding apparatus and the video decoding apparatus.

Fourth Embodiment

A fourth embodiment corresponds to a method of deriving motion of a direction in which a linear relationship is established among horizontal and vertical directions of motion using motion_info_l0 without signaling, while adjusting motion of a direction in which the linear relationship is not established using additionally signaled information (offset information).

For example, when the linear relationship is established only for a horizontal axis component of the motion, the horizontal axis component of the derived mv_l1 is used without change, but the vertical axis component where the linear relationship is not established is adjusted by using additionally signaled offset information. As another example, when the linear relationship is established only for the vertical axis component of the motion, the vertical axis component of the derived mv_l1 is used without change, but the horizontal axis component where the linear relationship is not established is adjusted using additionally signaled offset information.

The fourth embodiment may be implemented in a form combined with Embodiment 3-1 or 3-2 described above.

Hereinafter, the form in which the fourth embodiment is combined with Embodiment 3-1 and the form in which the fourth embodiment is combined with Embodiment 3-2 will be separately described.

Embodiment 4-1

Embodiment 4-1 corresponds to the form in which the fourth embodiment and Embodiment 3-1 are combined. In this embodiment, information signaled from the video encoding apparatus to the video decoding apparatus for the bi-prediction is expressed in syntax as shown in Table 10 below.

TABLE 10

| | |
|---|---|
| prediction direction information (bi-prediction) | inter_pred_idc |
| reference picture information (for L0 and L1) | ref_idx_l0, ref_idx_l1 |
| mvp information (for L0) | mvp_l0_flag |
| mvd (for L0) | mvd_l0 (abs_mvd_greater0_flag, abs_mvd_greater1_flag, abs_mvd_minus2, mvd_sign_flag) |
| mvd (for L1) | mvd_l1 (abs_mvd_greater0_flag, abs_mvd_greater1_flag, abs_mvd_minus2, mvd_sign_flag) |

In Table 10, mvd_l1 may be offset information (offset vector) or mvd of the conventional method. For example, when the linear relationship is not established for the horizontal axis component, mvd_l1 is an offset vector for the horizontal axis component, and when the linear relationship is not established for the vertical axis component, the mvd_l1 may be an offset vector for the vertical axis component. Also, when the linear relationship is not established for both the horizontal axis component and the vertical axis component, the mvd_l1 may be mvd of the conventional method. When the linear relationship is established for both the horizontal axis component and the vertical axis component, the mvd_l1 is not signaled.

motion_info_l0 may be signaled from the video encoding apparatus to the video decoding apparatus by being included in the bitstream. The signaled motion_info_l0 may include ref_idx_l0, mvd_l0, and mvp_l0_flag. ref_idx_l1 may also be signaled by being included in the bitstream. The video decoding apparatus sets the reference pictures indicated by the signaled reference picture information (ref_idx_l0 and ref_idx_l1) as the reference pictures (ref_l0 and ref_l1) for deducing the mv_l1.

When the motion_info_l0 is decoded (S1510), the video decoding apparatus may deduce or derive the mv_l0 by using the mvp_l0_flag and the mvd_l0 (S1520). Equation 1 may be used in this process. Also, the video decoding apparatus may decode the ref_idx_l1 from the bitstream (S1530).

When linear_MV_coding_enabled_flag indicates activation of a motion vector derivation function (S1540), the video decoding apparatus decodes linear_MV_coding_idc from the bitstream (S1550). Here, the linear_MV_codin- g_idc is information indicating whether a motion has a linear relationship and may indicate a component for which the linear relationship is established among the horizontal axis component and the vertical axis component of the motion by using the information.

When linear_MV_coding_idc=none (S1560), since the linear relationship is not established for both components, mvp_l1_flag and mvd_l1 are signaled as in the conventional method. Accordingly, the video decoding apparatus may decode the mvp_l1_flag and the mvd_l0 from the bitstream (S1562), and derive mv_l1 by using the decoded information (S1564). Also, when the linear_MV_coding_ enabled_flag does not indicate activation of the motion vector derivation function in operation S1540, the video decoding apparatus may derive the mv_l1 by using the decoded mvp_l1_flag and mvd_l1 (S1562 and S1564).

When linear_MV_coding=idc=x (S1570), since a linear relationship is established only for the horizontal axis component (x), an offset vector (mvd_l1, y) for the vertical axis component (y) for which the linear relationship is not established is signaled. Accordingly, the video decoding apparatus decodes the offset vector (mvd_l1, y) for the vertical axis component (S1572) and derives the mv_l1 using the linear relationship. Also, the video decoding apparatus may adjust the mv_l1 by applying the offset vector (mvd_l1, y) for the vertical axis component to the derived mv_l1 (S1576).

The video decoding apparatus may use, for the horizontal axis component, the "derived mv_l1" without change and use, for the vertical axis component, the adjusted second motion vector ($mv_A\_l1$). The horizontal axis component of the derived mv_l1 and the horizontal axis component of the adjusted second motion vector ($mv_A\_l1$) may be the same.

When linear_MV_coding_idc=y (S1580), since the linear relationship is established only for the vertical axis component, an offset vector (mvd_l1, x) for the horizontal axis component for which the linear relationship is not established is signaled. Accordingly, the video decoding apparatus may decode the offset vector (mvd_l1, x) for the horizontal axis component (S1582), and apply the offset vector (mvd_l1, x) for the horizontal axis component to the derived mv_l1 by using the linear relationship (S1584) to adjust the mv_l1 (S1586).

The video decoding apparatus may use, for the vertical axis component, the "derived mv_l1" without change and use, for the horizontal axis component, the adjusted second motion vector ($mv_A\_l1$). The vertical axis component of the derived mv_l1 and the vertical axis component of the adjusted second motion vector ($mv_A\_l1$) may be the same.

When linear_MV_coding_idc=(x&y) (S1580), since the linear relationship is established for both the horizontal axis component and the vertical axis component, the mvd_l1 (offset information or mvd information in the second direction) is not signaled. In this case, the video decoding apparatus derives the mv_l1 by using the motion_info_l0 and the ref_idx_l1 (S1590).

The syntax elements for Embodiment 4-1 are shown in Table 11 below.

TABLE 11

| | |
|---|---|
| prediction_unit( x0, y0, nPbW, nPbH ) {<br>  if( inter_pred_idc[ x0 ][ y0 ] != PRED_L0 ) {<br>    if( num_ref_idx_l1_active_minus1 > 0 )<br>      ref_idx_l1[ x0 ][ y0 ]<br>  if( linear_MV_coding_enabled_flag & inter_pred_idc[ x0 ][ y0 ] != PRED_L1 )<br>    linear_MV_coding_idc | Descriptor<br><br><br>ae(v) |

TABLE 11-continued

```
      if( linear_MV_coding_idc==none ) {
         mvd_coding( x0, y0, 1 )
         mvp_l1_flag[ x0 ][ y0 ]                                          ae(v)
      }
      else if( linear_MV_coding_idc==x )
         mvd_coding( x0, y0, y ) // only y
      else if( linear_MV_coding_idc==y )
         mvd_coding( x0, y0, x ) // only x
   }
}
```

Figure 15:
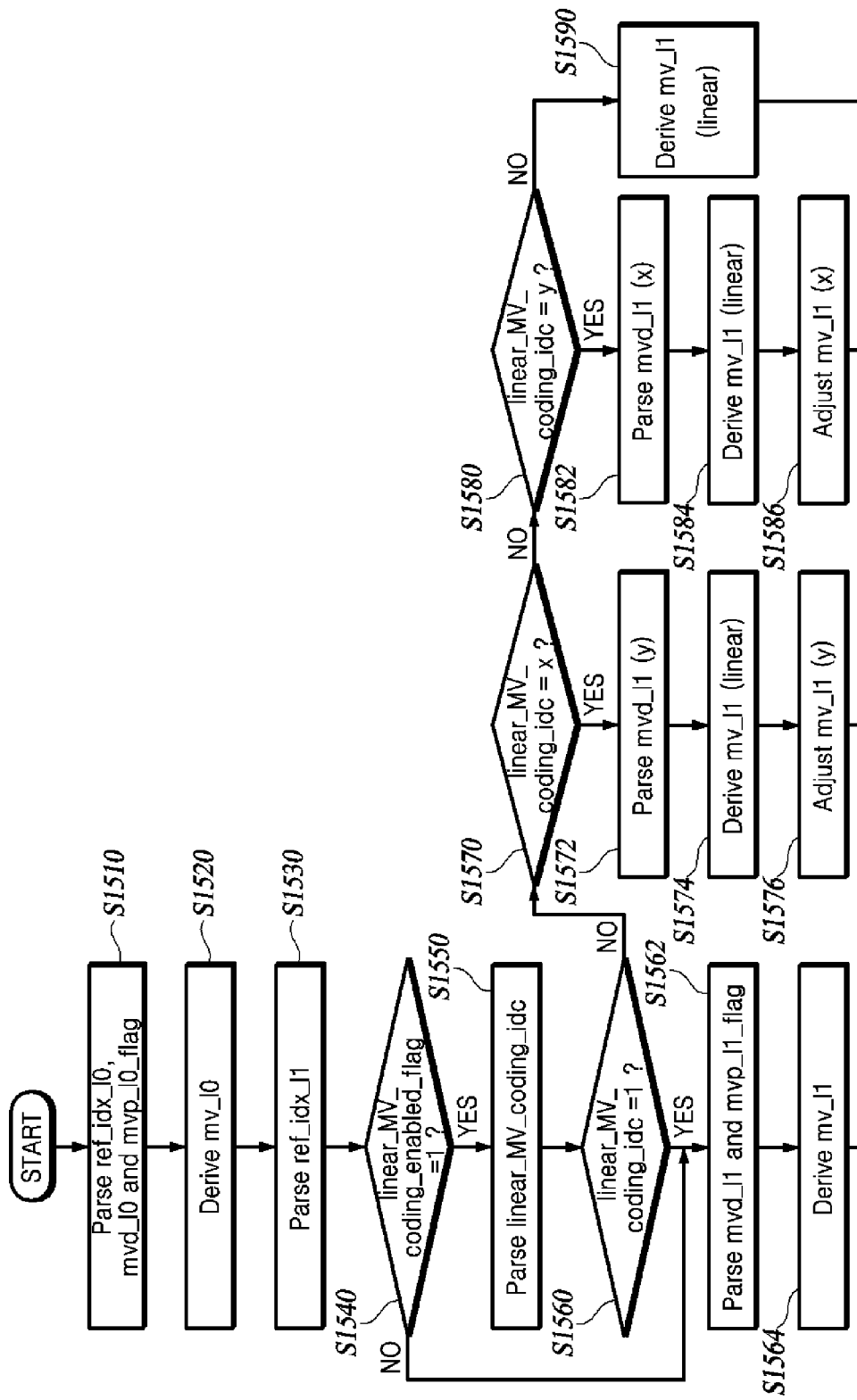

FIG. 15 illustrates that the operation of determining the linear_MV_coding_enabled_flag (S1540) and the operation of decoding and determining the linear_MV_coding_idc (S1550 to S1580) may be performed after the operation of decoding the ref_idx_l1 (S1530), but the operations S1540 to S1580 may be performed before the operation of decoding the motion_info_l0 (S1510).

Embodiment 4-2

Embodiment 4-2 corresponds to the form in which the fourth embodiment and Embodiment 3-2 are combined. In this embodiment, the information signaled from the video encoding apparatus to the video decoding apparatus for the bi-prediction is expressed in syntax as shown in Table 10 above.

In Table 10, mvd_l1 may be offset information (offset vector) or mvd of the conventional method. For example, when the linear relationship is not established for the horizontal axis component, mvd_l1 is an offset vector for the horizontal axis component, and when the linear relationship of the vertical axis component is not established, the mvd_l1 may be an offset vector for the vertical axis component. Also, when the linear relationship is not established for both the horizontal axis component and the vertical axis component, the mvd_l1 may be mvd of the conventional method. When the linear relationship is established for both the horizontal axis component and the vertical axis component, the mvd_l1 may be an offset vector for both components.

motion_info_l0 may be signaled from the video encoding apparatus to the video decoding apparatus by being included in the bitstream. The signaled motion_info_l0 may include ref_idx_l0, mvd_l0, and mvp_l0_flag. ref_idx_l1 may also be signaled by being included in the bitstream. The video decoding apparatus sets the reference pictures indicated by the signaled reference picture information (ref_idx_l0 and ref_idx_l1) as the reference pictures (ref_l0 and ref_l1) for deducing the mv_l1.

When the motion_info_l0 is decoded (S1610), the video decoding apparatus may deduce or derive the mv_l0 by using the mvp_l0_flag and the mvd_l0 (S1620). Equation 1 may be used in this process. Also, the video decoding apparatus may decode the ref_idx_l1 from the bitstream (S1630).

When the linear_MV_coding_enabled_flag indicates the activation of the motion vector derivation function (S1640), the video decoding apparatus decodes linear_MV_coding_idc from the bitstream (S1650).

When linear_MV_coding_idc=none (S1660), since the linear relationship is not established for both components, mvp_l1_flag and mvd_l1 are signaled as in the conventional method. Accordingly, the video decoding apparatus may decode the mvp_l1_flag and the mvd_l1 from the bitstream (S1662) and derive the mv_l1 by using the decoded information (S1664). Even when the linear_MV_coding_enabled_flag does not indicate the activation of the motion vector derivation function in operation S1640, the video decoding apparatus may derive the mv_l1 by using the decoded mvp_l1_flag and mvd_l1 (S1662 and S1664).

When linear_MV_coding_idc=x (S1670), since the linear relationship is established only for the horizontal axis component, the offset vector (mvd_l1, y) for the vertical axis component for which the linear relationship is not established is signaled. Accordingly, the video decoding apparatus decodes the offset vector (mvd_l1, y) for the vertical axis component (S1672), and derives the mv_l1 using the linear relationship (1674). Then, the video decoding apparatus may adjust the mv_l1 by applying the offset vector (mvd_l1, y) for the vertical axis component to the derived mv_l1 (S1676).

The video decoding apparatus may use, for the horizontal axis component, the "derived mv_l1" without change and use, for the vertical axis component, the adjusted second motion vector ($mv_A\_l1$). The horizontal axis component of the derived mv_l1 and the horizontal axis component of the adjusted second motion vector ($mv_A\_l1$) may be the same.

When linear_MV_coding_idc=y (S1680), since the linear relationship is established only for the vertical axis component, an offset vector (mvd_l1, x) for the horizontal axis component for which the linear relationship is not established is signaled. Accordingly, the video decoding apparatus may decode the offset vector (mvd_l1, x) for the horizontal axis component (S1682), derive mv_l1 derived by using the linear relationship (S1684), and apply the offset vector (mvd_l1, x) for the horizontal axis component to the derived mv_l1 to adjust the mv_l1 (S1686).

The video decoding apparatus may use, for the vertical axis component, the "derived mv_l1" without change and use, for the horizontal axis component, the adjusted second motion vector ($mv_A\_l1$). The vertical axis component of the derived mv_l1 and the vertical axis component of the adjusted second motion vector ($mv_A\_l1$) may be the same.

When linear_MV_coding_idc=(x&y) (S1680), since the linear relationship is established for both the horizontal axis component and the vertical axis component, the offset vectors (mvd_l1, x and y) for both the horizontal axis component and the vertical axis component are signaled. Therefore, the video decoding apparatus decodes the offset vectors (mvd_l1, x and y) for both the horizontal axis component and the vertical axis component from the bitstream (S1690), and the mv_l1 may be adjusted by applying the offset vectors (mvd_l1, x and y) to the mv_l1 derived using a linear relationship (S1692) (S1694).

The syntax elements for Embodiment 4-2 are shown in Table 12 below.

TABLE 12

```
prediction_unit( x0, y0, nPbW, nPbH ) {                                          Descriptor
  if( inter_pred_idc[ x0 ][ y0 ] != PRED_L0 ) {
    if( num_ref_idx_l1_active_minus1 > 0 )
      ref_idx_l1[ x0 ][ y0 ]                                                     ae(v)
    if( linear_MV_coding_enabled_flag & inter_pred_idc[ x0 ][ y0 ] != PRED_L1 )
      linear_MV_coding_idc
    if( linear_MV_coding_idc==none ) {
      mvd_coding( x0, y0, 1 )
      mvp_l1_flag[ x0 ][ y0 ]                                                    ae(v)
    }
    else if( linear_MV_coding_idc ==x )
      mvd_coding( x0, y0, y ) // only y
    else if( linear_MV_coding_idc==y )
      mvd_coding( x0, y0, x ) // only x
    else
      mvd_coding( x0, y0, 1 )
  }
}
```

Figure 16:
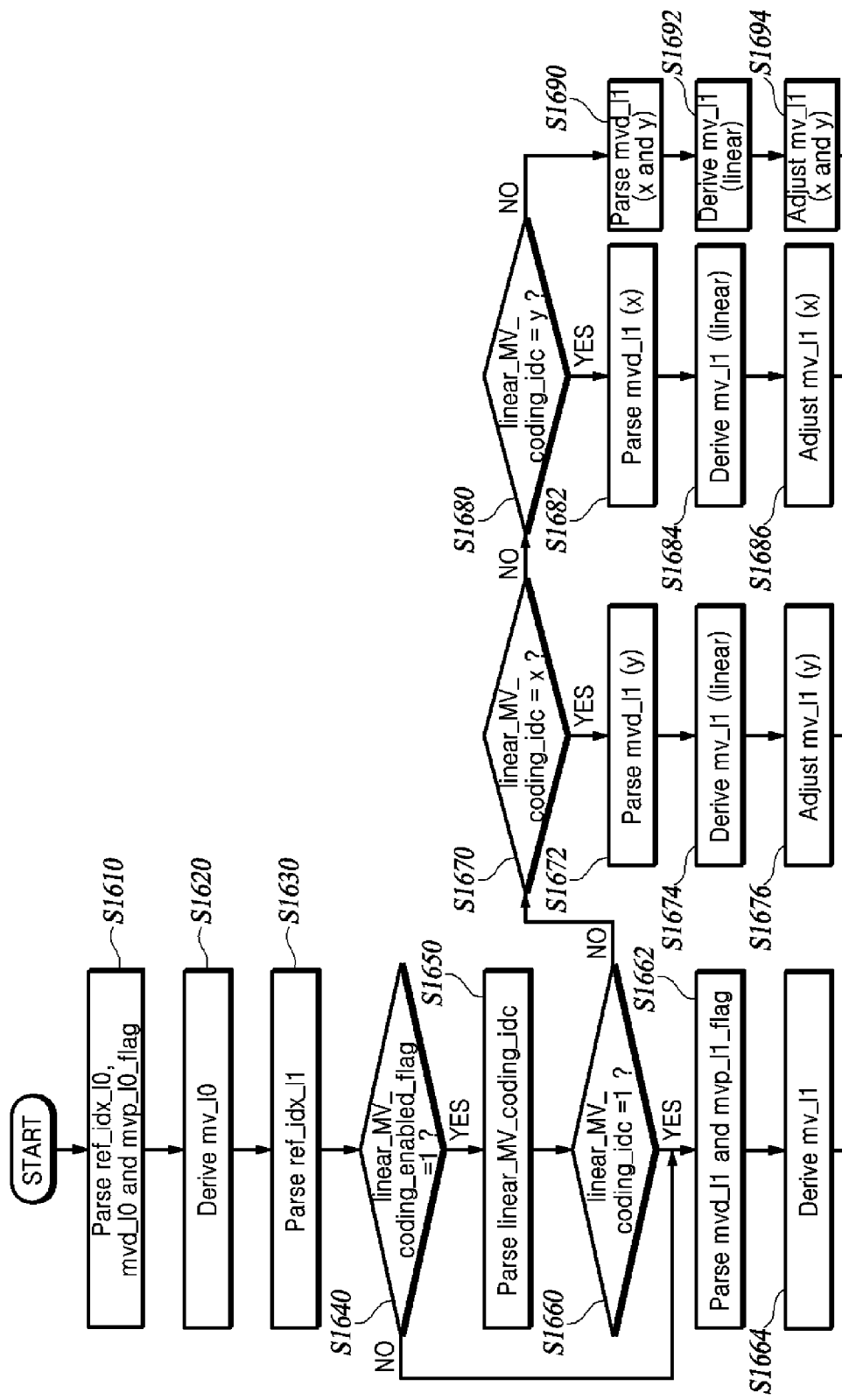

FIG. 16 illustrates that the operation of determining the linear_MV_coding_enabled_flag (S1640) and the operation of decoding and determining the linear_MV_coding_idc (S1650 to S1680) may be performed after the operation of decoding the ref_idx_l1 (S1630), but the operations S1640 to S1680 may be performed before the operation of decoding the motion_info_l0 (S1610).

Figure 17:
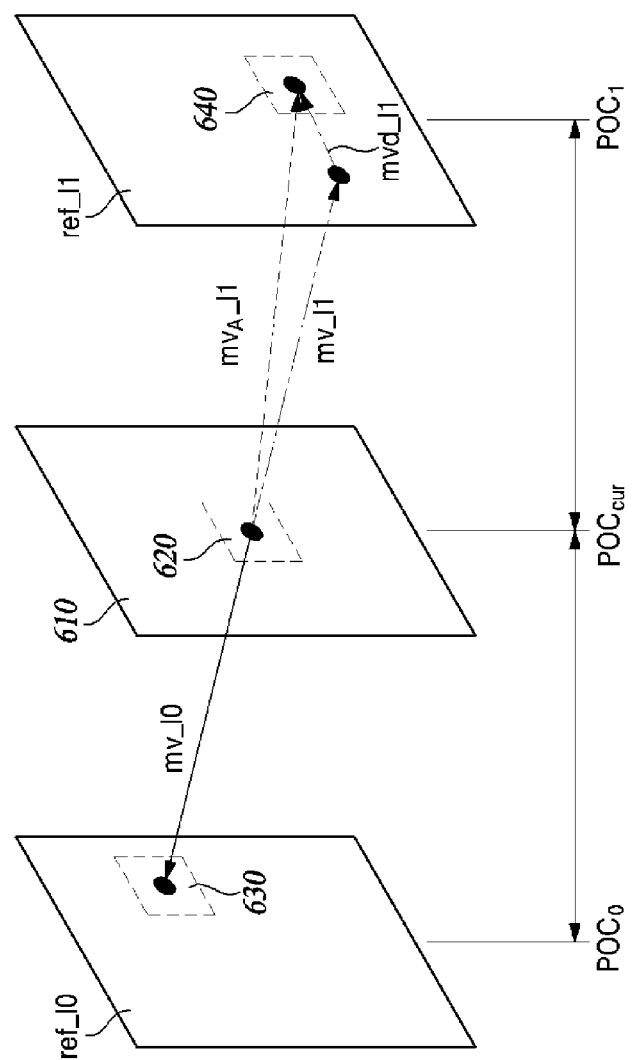

An example of deriving the mv_l1 based on the fourth embodiment is illustrated in FIG. 17. An example illustrated in FIG. 17 corresponds to an example in which the linear relationship is established for the vertical axis component.

As illustrated in FIG. 17, the mv_l1 may be derived on the premise that the linear relationship is established between the mv_l0 (solid arrow) and the mv_l1 (dash-dotted arrow).

Since the linear relationship is not established for the horizontal axis component, the mv_l1 may be adjusted by moving the position indicated by the derived mv_l1 in the horizontal axis direction according to the magnitude indicated by the offset vector mvd_l1. A final motion vector $mv_A\_l1$ in the second direction may be derived by using the vertical axis component of the mv_l1 without change and the horizontal axis component of the adjusted second motion vector $mv_A\_l1$. The current block 620 may be predicted based on the reference block 630 indicated by the mv_l0 and the reference block 640 indicated by the adjusted second motion vector ($mv_A\_l1$).

Fifth Embodiment

A fifth embodiment corresponds to a method of using preset reference pictures as reference pictures for deriving mv_l1. The preset reference pictures mean reference pictures preset to be used when a linear relationship of motion is established.

In the fifth embodiment, reference picture information (ref_idx_l0 and ref_idx_l1) is not signaled in units of blocks but may be signaled at a high level. Here, the high level may correspond to one or more of a picture-level header, a tile group-level header, a slice header, a tile header, and/or a CTU header. The preset reference pictures may be referred to as "representative reference picture" or "linear reference picture", and reference picture information signaled at the high level may be referred to as "representative reference picture information" or "linear reference picture information." When a linear relationship of motion is established, the preset linear reference picture is used in units of blocks.

The linear reference picture information signaled in the tile group header is shown in Table 13 below.

TABLE 13

```
tile_group_header( ) {                                      Descriptor
  if( tile_group_type==P || tile_group_type==B ) {
    if( linear_MV_coding_enabled_flag ) {
      if( num_ref_idx_l0_active_minus1 > 0 )
        linear_ref_idx_l0
      if( tile_group_type==B &&
          num_ref_idx_l1_active_minus1 > 0 )
        linear_ref_idx_l1
    }
  }
}
```

In Table 13, each of linear_ref_idx_l0 and linear_ref_idx_l1 represents the linear reference picture information signaled for each direction.

Figure 18:
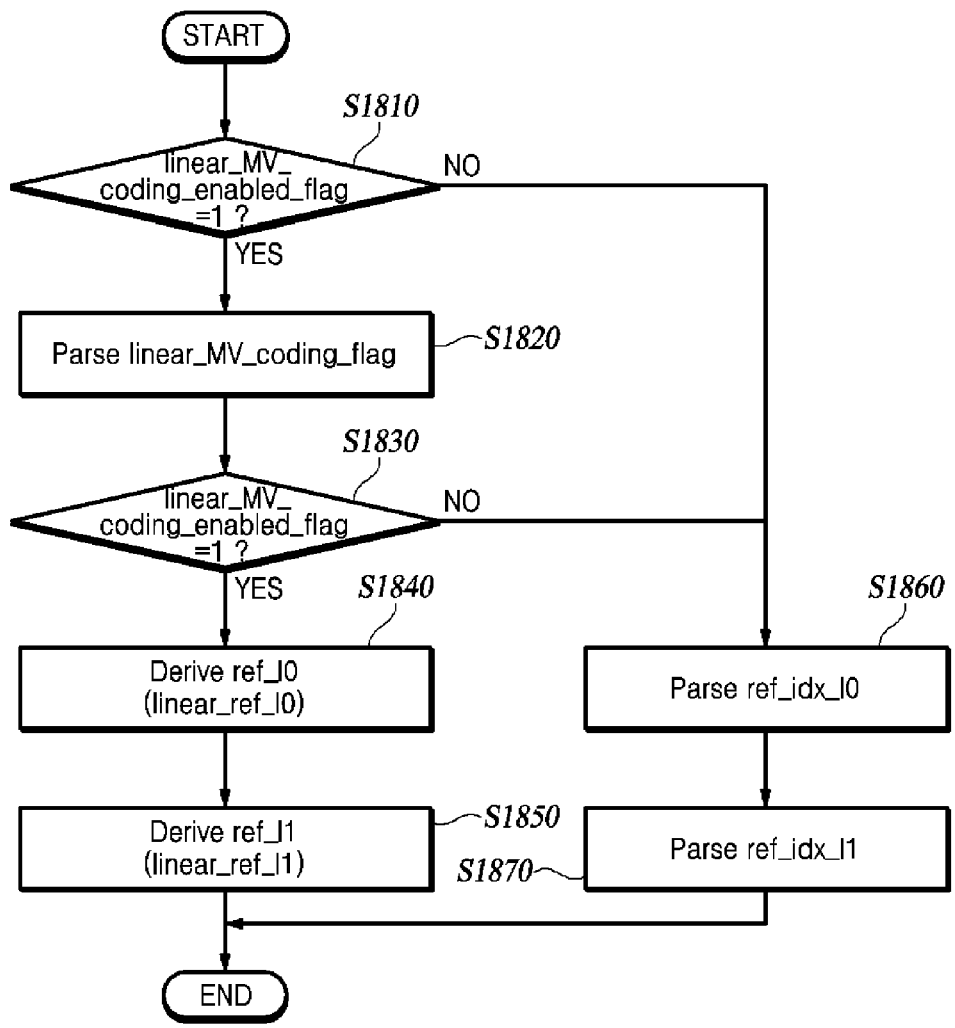

FIG. 18 illustrates an example of a method of specifying a reference picture by signaling reference picture information for each block in the conventional method or a method of specifying the linear reference picture by the method proposed in the present invention.

The linear reference picture information (linear_ref_idx_l0 and linear_ref_idx_l1) may be signaled from the video encoding apparatus to the video decoding apparatus through the high level. The video decoding apparatus may set linear reference pictures (linear_ref_l0 and linear_ref_l1) by selecting reference pictures indicated by the signaled linear reference picture information (linear_ref_idx_l0 and linear_ref_idx_l1) within the reference picture list.

When linear_MV_coding_enabled_flag indicates activation of a motion vector derivation function (S1810), the video decoding apparatus decodes linear_MV_coding_flag from the bitstream (S1820).

When the linear_MV_coding_flag indicates that the linear relationship of motion is established (S1830), the video decoding apparatus may derive reference pictures (ref_l0 and ref_l1) for derivation of the mv_l1 using the preset linear reference pictures (linear_ref_l0 and linear_ref_l1) (S1840 and S1850). That is, the preset linear reference pictures (linear_ref_l0 and linear_ref_l1) may be set as reference pictures (ref_l0 and ref_l1).

Meanwhile, when the linear_MV_coding_enabled_flag does not indicate the activation of the motion vector derivation function in operation S1810 or the linear_MV_coding_flag does not indicate that the linear relationship of motion is established in operation S1830, the reference picture information (ref_idx_l0 and ref_idx_l1) may be signaled. The video decoding apparatus may decode the reference picture information (ref_idx_l0 and ref_idx_l1) (S1860 and S1870), and set the reference picture using the reference picture information.

Figure 19:
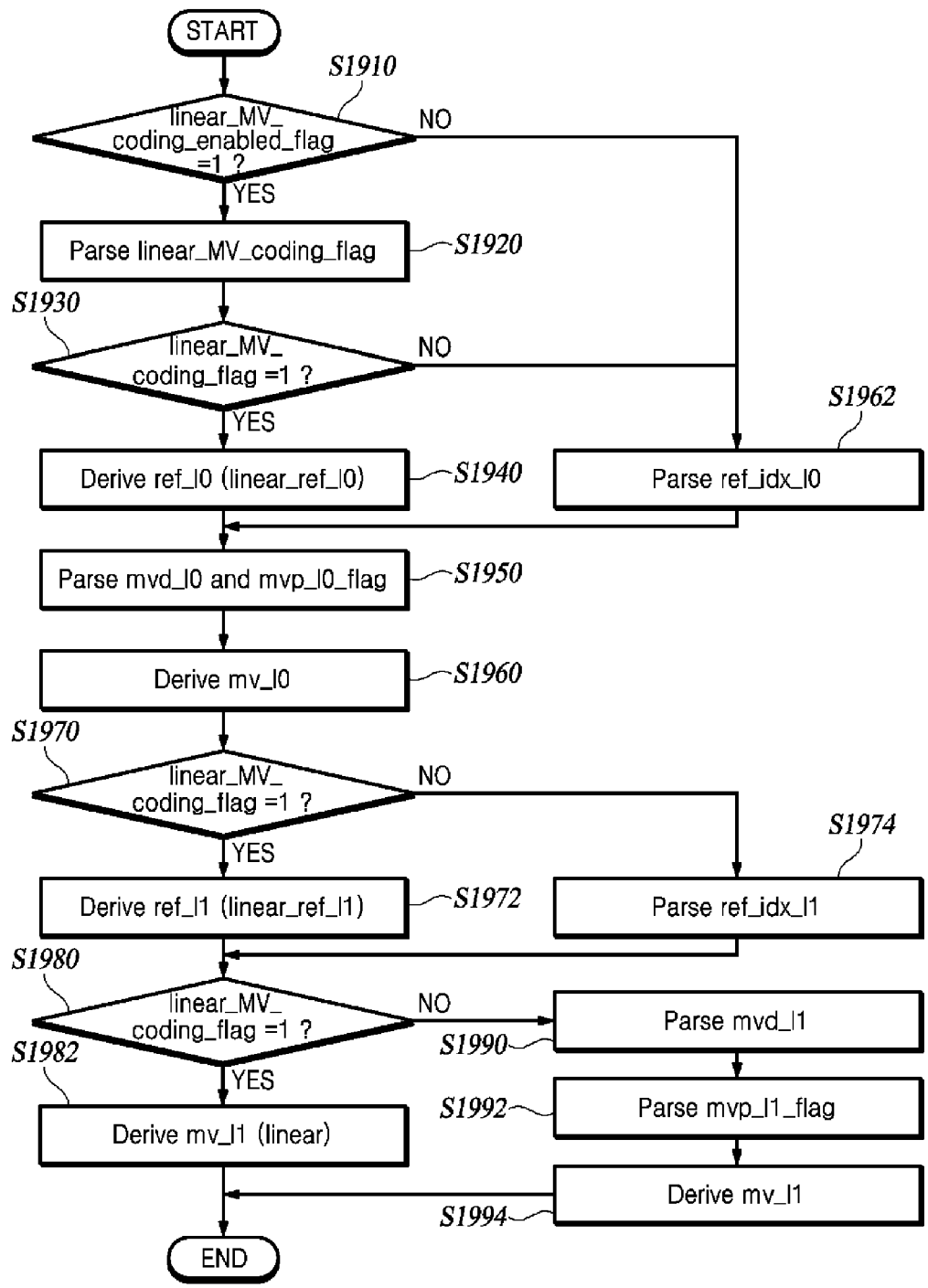
FIGS. 19 and 20 are flowcharts for describing derivation of motion using a reference picture determined at a high level according to an embodiment of the present invention.

The method of setting a reference picture proposed by the present invention may be implemented in combination with the above-described embodiments. FIG. 19 illustrates the form in which the method of setting a reference picture proposed by the present invention and the above-described embodiment 3-1 are combined.

With respect to the first direction, when the linear_MV_coding_enabled_flag indicates the activation of the motion vector derivation function (S1910), the linear_MV_coding_flag is decoded (S1920). When the linear_MV_coding_flag indicates that the linear relationship of motion is established, the preset linear reference picture (linear_ref_l0) may be derived as the reference picture (ref_l0) (S1940). On the other hand, when the linear_MV_coding_enabled_flag does not indicate the activation of the motion vector derivation function or the linear_MV_coding_flag does not indicate that the linear relationship of motion is established, the reference picture (ref_l0) may be set by using the reference picture information (ref_idx_l0) decoded from the bitstream (S1962).

When the derivation or setting of the reference picture for the first direction is completed, mvd_l0 and mvp_l0_flag are decoded (S1950), and mv_l0 may be derived using the decoded information (S1960).

With respect to the second direction, when the linear_MV_coding_flag indicates that the linear relationship of motion is established (S1970), the reference picture (ref_l1) may be derived or set using the preset linear reference picture (linear_ref_l1) (S1972). On the other hand, when the linear_MV_coding_flag does not indicate that the linear relationship of motion is established, the reference picture (ref_l1) may be set using the reference picture information (ref_idx_l1) decoded from the bitstream (S1974).

When the derivation or setting of the reference picture for the second direction is completed, in the case where when the linear_MV_coding_flag indicates that the linear relationship of motion is established (S1980), mv_l1 having a linear relationship with mv_l0 may be derived (S1982). On the other hand, when the linear_MV_coding_flag does not indicate that the linear relationship of motion is established (S1980), the mv_l1 may be derived using mvd_l1 and mvp_l1_flag decoded from the bitstream (S1990 and S1992) (S1994).

The syntax elements for the embodiments described above are shown in Table 14 below.

TABLE 14

| prediction_unit( x0, y0, nPbW, nPbH ) { | Descriptor |
|---|---|
| ... | |
|     if( tile_group_type = = B ) | |
|       inter_pred_idc[ x0 ][ y0 ] | ae(v) |
|     if( linear_MV_coding_enabled_flag && inter_pred_idc[ x0 ][ y0 ] == PRED_BI ) | |
|       linear_MV_coding_flag | |
|     if( inter_pred_idc[ x0 ][ y0 ] != PRED_L1 ) { | |
|       if( num_ref_idx_l0_active_minus1 > 0 && !linear_MV_coding_flag ) | |
|         ref_idx_l0[ x0 ][ y0 ] | ae(v) |
|       mvd_coding( x0, y0, 0 ) | |
|       mvp_l0_flag[ x0 ][ y0 ] | ae(v) |
|     } | |
|     if( inter_pred_idc[ x0 ][ y0 ] != PRED_L0 ) { | |
|       if( num_ref_idx_l1_active_minus1 > 0 && !linear_MV_coding_flag ) | |
|         ref_idx_l1[ x0 ][ y0 ] | ae(v) |
|       if( !linear_MV_coding_flag ) { | |
|         mvd_coding( x0, y0, 1 ) | |
|         mvp_l1_flag[ x0 ][ y0 ] | ae(v) |
|       } | |
|     } | |
| } | |

Figure 20:
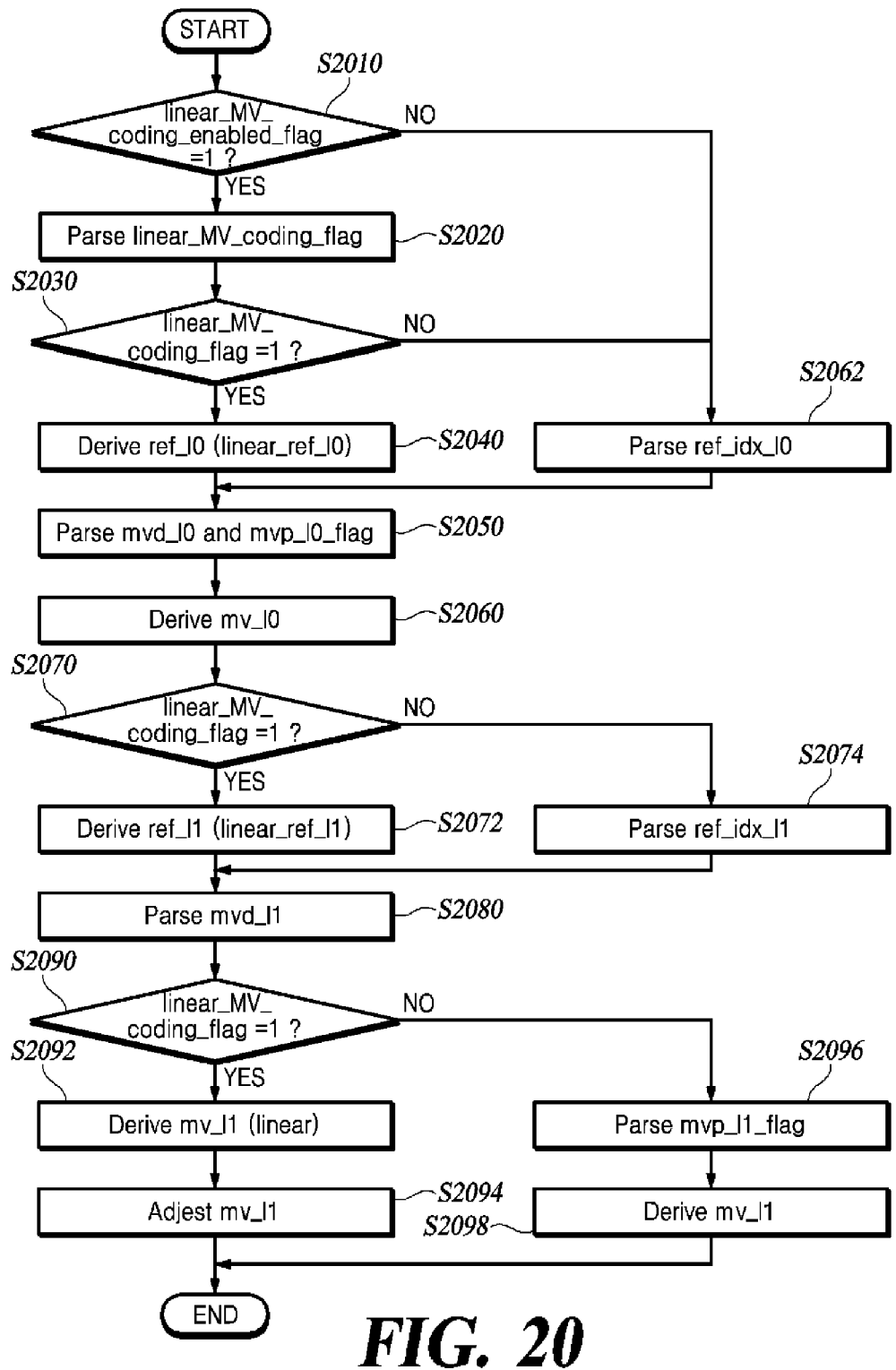

FIG. 20 illustrates the form in which the method of setting a reference picture proposed by the present invention and the above-described embodiment 3-2 are combined.

With respect to the first direction, when the linear_MV_coding_enabled_flag indicates the activation of the motion vector derivation function (S2010), the linear_MV_coding_flag is decoded (S2020). When the linear_MV_coding_flag indicates that the linear relationship of motion is established (S2030), the reference picture (ref_l0) may be derived or set using the preset linear reference picture (linear_ref_l0) (S2040). On the other hand, when the linear_MV_coding_enabled_flag does not indicate the activation of the motion vector derivation function (S2010) or the linear_MV_coding_flag does not indicate that the linear relationship of motion is established (S2030), the reference picture (ref_l0) may be set using the reference picture information (ref_idx_l0) decoded from the bitstream (S2062).

When the derivation or setting of the reference picture for the first direction is completed, the mvd_l0 and the mvp_l0_flag are decoded (S2050), and the mv_l0 may be derived using the decoded information (S2060).

With respect to the second direction, when the linear_MV_coding_flag indicates that the linear relationship of motion is established (S2070), the reference picture (ref_l1) may be derived or set using the preset linear reference picture (linear_ref_l1) (S2072). On the other hand, when the linear_MV_coding_flag does not indicate that the linear relationship of motion is established, the reference picture (ref_l1) may be set using the reference picture information (ref_idx_l1) decoded from the bitstream (S2074).

When the derivation or setting of the reference picture for the second direction is completed, the mvd_l1 is decoded from the bitstream (S2080), and the mvd_l1 corresponds to either the offset vector or the mvd of the conventional method as in Embodiment 3-2.

When the linear_MV_coding_flag indicates that the linear relationship of motion is established (S2090), the mv_l1 having the linear relationship with the mv_l0 is derived (S2092), and the mv_l1 may be adjusted by applying the offset vector (mvd_l1) to the derived mv_l1 (S2094). On the other hand, when the linear_MV_coding_flag does not indicate that the linear relationship of motion is established (S2090), the mv_l1 may be derived using the mvp_l1_flag decoded from the bitstream (S2096 and S2098). In this process, the mvp_l1 indicated by the mvp_l1_flag and the decoded mvd_l1 (mvd of the conventional method) may be used.

Although exemplary embodiments of the present invention have been described for illustrative purposes, those skilled in the art will appreciate that and various modifications and changes are possible, without departing from the idea and scope of the invention. Exemplary embodiments have been described for the sake of brevity and clarity. Accordingly, one of ordinary skill would understand that the scope of the present invention is not limited by the embodiments explicitly described above but is inclusive of the claims and equivalents thereto.

What is claimed is:

1. A video decoding method of inter-predicting a current block using any one of a plurality of bi-prediction modes, the method comprising:
    decoding enabled information indicating whether a first mode of the plurality of bi-prediction modes is allowed;
    decoding, at a block level for the current block, mode information indicating whether the first mode is applied to the current block, when the enabled information indicates that the first mode is allowed;
    when the mode information indicates that the first mode is applied to the current block,
        decoding, at the block level, first motion information including differential motion vector information and predicted motion vector information for a first motion vector and second motion information not including at least a portion of predicted motion vector information and differential motion vector information for a second motion vector, and
        deriving the first motion vector based on the first motion information, and deriving the second motion vector based on at least a portion of the first motion information and based on the second motion information; and
    predicting the current block using a reference block indicated by the first motion vector in a first reference picture and a reference block indicated by the second motion vector in a second reference picture,
    wherein the first and second reference pictures are determined at a high level that is upper than the block level, and thereby are used in common as reference pictures for not only the current block but also blocks, associated with the high level, to which the first mode is applied.

2. The method of claim 1, further comprising when the mode information indicates the first mode is not applied to the current block,
    decoding, from a bitstream, the first motion information, and third motion information including the differential motion vector information and the predicted motion vector information for the second motion vector; and
    deriving the first motion vector based on the first motion information and deriving the second motion vector based on the third motion information.

3. The method of claim 1,
    wherein the mode information is not decoded at the block level and set as indicating that the first mode is not applied, when the enabled information indicates that the first mode is not allowed.

4. The method of claim 1, wherein the enabled information is decoded at a sequence level, a picture level, a tile group level, or a slice level.

5. The method of claim 1, wherein
    the high level is a picture level, a tile group level, a slice level, a tile level, or a coding tree unit level.

6. The method of claim 1, wherein the first and second reference pictures are determined based on differences in a picture order count (POC) between reference pictures included in reference picture lists and a current picture.

7. The method of claim 1, further comprising, after the derivation of the second motion vector, adjusting the second motion vector by applying offset information included in a bitstream to the second motion vector,
    wherein the current block is predicted by using the reference block indicated by the adjusted second motion vector in the second reference picture and the reference block indicated by the first motion vector in the first reference picture.

8. The method of claim 7, wherein the offset information is an offset vector having a position indicated by the second motion vector as an origin, and
    the adjusting includes adjusting the second motion vector to the position indicated by the offset vector.

9. The method of claim 7, wherein the offset information is an offset index indicating any one of a plurality of preset offset vector candidates, and
    the adjusting includes adjusting the second motion vector by applying an offset vector candidate indicated by the offset index to the second motion vector.

10. The method of claim 1, wherein the second motion information includes the predicted motion vector information for the second motion vector and does not includes the differential motion vector information for the second motion vector,
    wherein the derivation of the second motion vector comprises:
        deriving a differential motion vector for the second motion vector from the differential motion vector information for the first motion vector, using a linear equation, and
        deriving the second motion vector using the differential motion vector for the second motion vector and the predicted motion vector information for the second motion vector.

11. A method, performed at a video encoding apparatus, for inter-predicting a current block using any one of a plurality of bi-prediction modes, the method comprising:
    encoding enabled information indicating whether a first mode of the plurality of bi-prediction modes is allowed;
    encoding, at a block level for the current block, mode information indicating whether the first mode is applied to the current block;
    when the mode information indicates that the first mode is applied,
        encoding, at the block level, first motion information including differential motion vector information and predicted motion vector information for a first motion vector, and second motion information not including at least a portion of predicted motion vector information and differential motion vector information for a second motion vector,
        wherein in the first mode at least a portion of the first motion information is used together with the second motion information for derivation of the second motion vector at a video decoding apparatus; and encoding, into a bitstream, a residual block that is a difference between the current block and a predicted block thereof, wherein the predicted block is generated by using a reference block indicated by the first motion vector in a first reference picture and a reference block indicated by the second motion vector in a second reference picture, wherein the first and second reference pictures are determined at a high level that is upper than the block level, and thereby are used in common as reference pictures for not only the current block but also blocks, associated with the high level, to which the first mode is applied.

12. The method of claim 11, further comprising when the mode information indicates the first mode is not applied to the current block:

encoding, into the bitstream, the first motion information, and third motion information including the differential motion vector information and the predicted motion vector information for the second motion vector.

13. The method of claim 11, wherein the enabled information is encoded at a sequence level, a picture level, a tile group level, or a slice level.

14. The method of claim 11, wherein the high level includes one or more of a picture level, a tile group level, a slice level, a tile level, and a coding tree unit level.

15. The method of claim 11, wherein the first and second reference pictures are determined based on differences in a picture order count (POC) between reference pictures included in reference picture lists and a current picture.

16. The method of claim 11, further comprising, when the mode information indicates that the first mode is applied, encoding offset information into the bitstream, wherein the offset information is used for derivation of the second motion vector at the video decoding apparatus, in addition to the second motion information and the at least a portion of the first motion information.

17. A non-transitory computer readable medium storing a bitstream encoded by an inter prediction method using any one of a plurality of bi-prediction modes, the method comprising:

encoding enabled information indicating whether a first mode of the plurality of bi-prediction modes is allowed;

encoding, at a block level for the current block, mode information indicating whether the first mode is applied to the current block;

when the mode information indicates that the first mode is applied, encoding, at the block level, first motion information including differential motion vector information and predicted motion vector information for a first motion vector, and second motion information not including at least a portion of predicted motion vector information and differential motion vector information for a second motion vector, wherein in the first mode at least a portion of the first motion information is used together with the second motion information for derivation of the second motion vector at a video decoding apparatus; and encoding a residual block that is a difference between the current block and a predicted block thereof, wherein the predicted block is generated by using a reference block indicated by the first motion vector in a first reference picture and a reference block indicated by the second motion vector in a second reference picture, wherein the first and second reference pictures are determined at a high level that is upper than the block level, and thereby are used in common as reference pictures for not only the current block but also blocks, associated with the high level, to which the first mode is applied.

* * * * *